(12) United States Patent
Takahashi

(10) Patent No.: US 8,700,436 B2
(45) Date of Patent: Apr. 15, 2014

(54) GROUP RESERVATION SUPPORT SYSTEM

(75) Inventor: Naoki Takahashi, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/387,968

(22) PCT Filed: Jul. 14, 2010

(86) PCT No.: PCT/JP2010/061900
§ 371 (c)(1),
(2), (4) Date: Apr. 11, 2012

(87) PCT Pub. No.: WO2011/013512
PCT Pub. Date: Feb. 3, 2011

(65) Prior Publication Data
US 2012/0191489 A1    Jul. 26, 2012

(30) Foreign Application Priority Data

Jul. 31, 2009 (JP) .............................. P2009-179938
Jul. 31, 2009 (JP) .............................. P2009-179939

(51) Int. Cl.
*G06Q 50/00* (2012.01)
*G06Q 10/00* (2012.01)

(52) U.S. Cl.
USPC ............................. 705/6; 705/1.1; 705/7.11

(58) Field of Classification Search
USPC ................. 705/1.1, 5–6, 7.11–7.42, 400–418
See application file for complete search history.

(56) References Cited

U.S. PATENT DOCUMENTS

| | | | |
|---|---|---|---|
| 2002/0022981 A1* | 2/2002 | Goldstein | 705/6 |
| 2002/0072939 A1* | 6/2002 | Kawaberi | 705/5 |
| 2004/0215592 A1 | 10/2004 | Matsuura et al. | |
| 2006/0106655 A1* | 5/2006 | Lettovsky et al. | 705/6 |
| 2006/0206363 A1* | 9/2006 | Gove | 705/6 |
| 2007/0164726 A1* | 7/2007 | de Marcken et al. | 324/127 |
| 2009/0307020 A1* | 12/2009 | Viale et al. | 705/5 |

FOREIGN PATENT DOCUMENTS

| | | |
|---|---|---|
| EP | 1 840 806 A1 | 10/2007 |
| JP | 2002-169925 A | 6/2002 |
| JP | 2002-183479 A | 6/2002 |
| JP | 2002-183566 A | 6/2002 |
| JP | 2003-108840 A | 4/2003 |
| JP | 2003-141066 A | 5/2003 |
| JP | 2006-323805 A | 11/2006 |

OTHER PUBLICATIONS

"Rakuten Travel, [online], (URL: http://travel.rakuten.co.jp/travel.rakuten.co.jp/index.html)", Rakuten Travel Inc., 3 pages.

(Continued)

*Primary Examiner* — George Chen
(74) *Attorney, Agent, or Firm* — Sughrue Mion, PLLC

(57) ABSTRACT

Provided a framework that allows a user who represents a group and carries out an accommodation reservation procedure to solicit participating members while holding an accommodation. The procedures includes: (1) receiving a tentative reservation application from an organizer, requesting approval from members, receiving responses to the request for approval from the members, and sequentially identifying a tentative reservation number, member and answer; (2) when the identified answer is "approved" (Yes in S1122), adding 1 to "number of members decided to participate" (S1124); (3) when the number of members decided to participate is the multiple of the maximum number of guests (Yes in S2026), adding 1 to "reservation placement plan quantity" (S2028), assigning a new reservation number, and registering reservation information of an order quantity 1 into the reservation DB (14) (S2030).

20 Claims, 21 Drawing Sheets

(56) References Cited

OTHER PUBLICATIONS

"How to Use Rakuten Travel-Steps of booking hotels in Japan, [online], (URL:http://travel.rakuten.co.jp/howto/domestic.html)", Rakuten Travel, Inc., 4 pages.

"Help-Booking Hotels in Japan, [online], (URL:http://travel.rakuten.co.jp/help/kokunai/hote1/01.html)", Rakuten Travel, Inc., 5 pages.
International Search Report of PCT/JP2010/061900 dated Sep. 28, 2010.
Taiwanese Office Action issued in counterpart application No. 099124922 dated Jun. 20, 2013.

* cited by examiner

Fig.4

(a) USER INFORMATION (USER DB)

| USER ID |
|---|
| PASSWORD |
| EMAIL ADDRESS |
| ⋮ |

(b-1) FACILITY BASIC INFORMATION (FACILITY DB)

| FACILITY ID |
|---|
| PASSWORD |
| EMAIL ADDRESS |
| TENTATIVE RESERVATION BOOKING PERIOD (x DAYS AFTER TENTATIVE RESERVATION) |
| TENTATIVE RESERVATION NO-BOOKING PERIOD (x DAYS BEFORE DATE OF STAY) |
| ⋮ |

(b-2) GUEST ROOM BASIC INFORMATION (FACILITY DB)

| FACILITY ID |
|---|
| ROOM TYPE |
| CAPACITY |
| ⋮ |

(b-3) GUEST ROOM ALLOCATION INFORMATION (FACILITY DB)

| FACILITY ID |
|---|
| DATE OF STAY |
| ROOM TYPE |
| ACCOMMODATION PLAN ID |
| ALLOCATED QUANTITY |
| ⋮ |

(b-4) VACANCY MANAGEMENT INFORMATION (FACILITY DB)

| FACILITY ID |
|---|
| DATE OF STAY |
| ROOM TYPE |
| VACANT ROOM QUANTITY |
| RESERVED ROOM QUANTITY |
| TENTATIVELY RESERVED ROOM QUANTITY |
| ⋮ |

(c-1) ACCOMMODATION PLAN BASIC INFORMATION (ACCOMMODATION PLAN DB)

| ACCOMMODATION PLAN ID |
|---|
| FACILITY ID |
| DATE OF STAY |
| ROOM TYPE |
| MAXIMUM NUMBER OF GUESTS |
| ⋮ |

(c-2) STOCK MANAGEMENT INFORMATION (ACCOMMODATION PLAN DB)

| ACCOMMODATION PLAN ID |
|---|
| STOCK QUANTITY |
| ⋮ |

Fig.5

(a) RESERVATION INFORMATION (RESERVATION DB)

| RESERVATION NUMBER |
|---|
| TENTATIVE RESERVATION NUMBER |
| USER ID (ORGANIZER) |
| ACCOMMODATION PLAN ID |
| ORDER QUANTITY |
| ⋮ |

(e-1) TENTATIVE RESERVATION BASIC INFORMATION (TENTATIVE RESERVATION DB)

| TENTATIVE RESERVATION NUMBER |
|---|
| USER ID (ORGANIZER) |
| ACCOMMODATION PLAN ID |
| TENTATIVE ORDER QUANTITY |
| MAXIMUM NUMBER OF GUESTS |
| RESPONSE DUE DATE |
| MESSAGE FILE PATH |
| TENTATIVE RESERVATION IDENTIFICATION DATA |
| ⋮ |

(e-2) TENTATIVE RESERVATION MANAGEMENT INFORMATION (TENTATIVE RESERVATION DB)

| TENTATIVE RESERVATION NUMBER |
|---|
| NUMBER OF MEMBERS DECIDED TO PARTICIPATE |
| RESERVATION PLACEMENT PLAN QUANTITY |
| NUMBER OF UNANSWERED MEMBERS |
| TENTATIVE RESERVATION STATUS |
| ⋮ |

(e-3) MEMBER BASIC INFORMATION (TENTATIVE RESERVATION DB)

| TENTATIVE RESERVATION NUMBER |
|---|
| MEMBER ID |
| NICKNAME |
| EMAIL ADDRESS |
| MEMBER IDENTIFICATION DATA |
| ⋮ |

(e-4) MEMBER MANAGEMENT INFORMATION (TENTATIVE RESERVATION DB)

| TENTATIVE RESERVATION NUMBER |
|---|
| MEMBER ID |
| RESPONSE FLAG |
| APPROVAL FLAG |
| ⋮ |

*Fig.7*

(a) TENTATIVE RESERVATION APPLICATION INFORMATION ITEM

| ORGANIZER USER ID |
|---|
| ACCOMMODATION PLAN ID |
| TENTATIVE ORDER QUANTITY |
| RESPONSE DUE DATE |
| ⋮ |

(b) MEMBER REGISTRATION INFORMATION ITEM

| TENTATIVE RESERVATION NUMBER |
|---|
| MESSAGE |
| MEMBER 1 NICKNAME |
| MEMBER 1 EMAIL ADDRESS |
| MEMBER 2 NICKNAME |
| MEMBER 2 EMAIL ADDRESS |
| ⋮ |
| ⋮ |

(c) PAGE SENDING REQUEST A ITEM

| TENTATIVE RESERVATION IDENTIFICATION DATA |
|---|
| MEMBER IDENTIFICATION DATA |
| RESPONSE IDENTIFICATION CODE (APPROVED/NOT APPROVED) |
| ⋮ |

(d) PAGE SENDING REQUEST B ITEM

| TENTATIVE RESERVATION IDENTIFICATION DATA |
|---|
| MEMBER IDENTIFICATION DATA |
| ⋮ |

(e) ADDITIONAL MEMBER REGISTRATION INFORMATION ITEM

| TENTATIVE RESERVATION NUMBER |
|---|
| MESSAGE |
| ADDITIONAL MEMBER 1 NICKNAME |
| ADDITIONAL MEMBER 1 EMAIL ADDRESS |
| ADDITIONAL MEMBER 2 NICKNAME |
| ADDITIONAL MEMBER 2 EMAIL ADDRESS |
| ⋮ |
| ⋮ |

TENTATIVE RESERVATION CONFIRMATION PAGE

■ TENTATIVE RESERVATION NUMBER 200904061 2345678

XX HOTEL THREE ROOMS, TWO PER ROOM: TOTAL ¥0000

■ TENTATIVE RESERVATION PERIOD IS UNTIL (DAY) (MONTH) (YEAR)
■ THREE ROOMS ARE CURRENTLY TENTATIVELY RESERVED

FIRST ROOM: FINALIZED

SECOND ROOM: FINALIZED

THIRD ROOM: NOT YET FINALIZED

■ MEMBER RESPONSE STATUS.

B: PARTICIPATE

C: NOT PARTICIPATE

D: PARTICIPATE

E: PARTICIPATE

F: UNANSWERED

| G | ggg@mail.com | ←—1533

ADD MEMBER

MESSAGE

THIS IS A.
I AM PLANNING TO VISIT HAKONE IN MAY.
PLEASE JOIN!

SEND EMAIL TO ADDITIONAL MEMBER ←—1534

RESEND EMAIL TO UNANSWERED MEMBER!

FINALIZE RESERVATIONS     CANCEL TENTATIVE RESERVATIONS

Fig.17

TENTATIVE RESERVATION CONFIRMATION PAGE

- TENTATIVE RESERVATION NUMBER 2009040612345678

XX HOTEL THREE ROOMS, TWO PER ROOM: TOTAL ¥0000

- TENTATIVE RESERVATION PERIOD IS UNTIL (DAY) (MONTH) (YEAR)
- THREE ROOMS ARE CURRENTLY TENTATIVELY RESERVED

FIRST ROOM: FINALIZED

SECOND ROOM: FINALIZED

THIRD ROOM: NOT YET FINALIZED

■ MEMBER RESPONSE STATUS

B: PARTICIPATE

C: NOT PARTICIPATE

D: PARTICIPATE

E: PARTICIPATE

F: UNANSWERED

G: UNANSWERED

ADD MEMBER

MESSAGE

THIS IS A.
I AM PLANNING TO VISIT HAKONE IN MAY.
PLEASE JOIN!

RESEND EMAIL TO UNANSWERED MEMBER

FINALIZE RESERVATIONS    CANCEL TENTATIVE RESERVATIONS

Fig.18
(a) 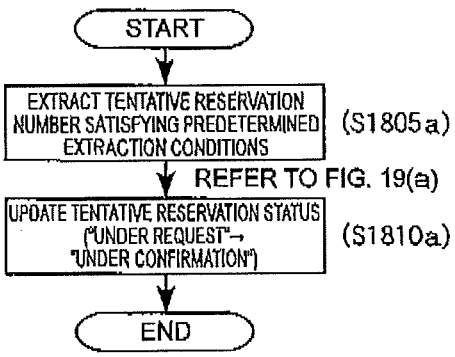
(b) 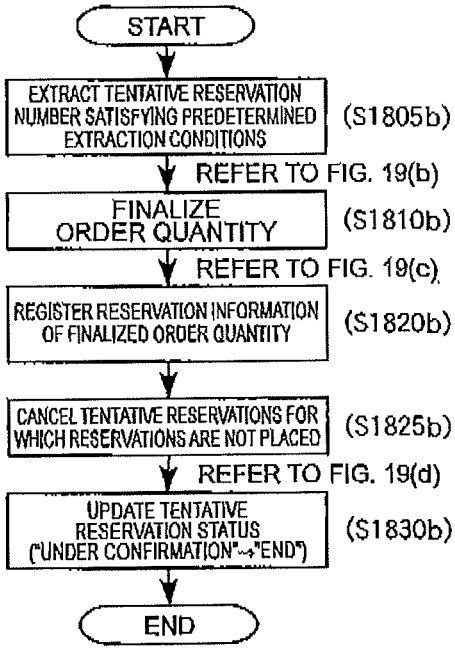
(c) 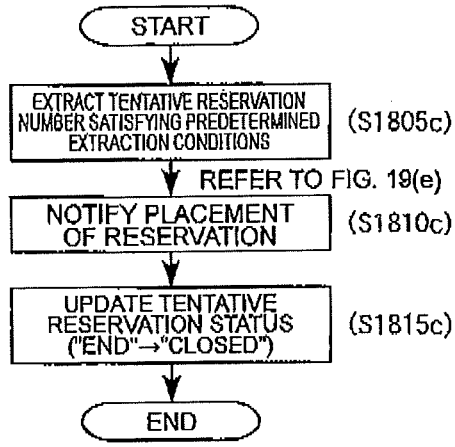

Fig.19

(a) EXTRACTION CONDITIONS A

[CONDITION A1] TENTATIVE RESERVATION STATUS IS "UNDER REQUEST"

[CONDITION A2] RESPONSE DUE DATE HAS PASSED (b) EXTRACTION CONDITIONS B

TENTATIVE RESERVATION STATUS IS "UNDER CONFIRMATION"

(c) ORDER QUANTITY

ORDER QUANTITY = MINIMUM NATURAL NUMBER EQUAL TO OR LARGER THAN (NUMBER OF MEMBERS DECIDED TO PARTICIPATE / MAXIMUM NUMBER OF GUESTS)

(d) CANCELLATION QUANTITY

CANCELLATION QUANTITY =
  TENTATIVE ORDER QUANTITY - ORDER QUANTITY (e) EXTRACTION CONDITIONS C

TENTATIVE RESERVATION STATUS IS "END"

GROUP RESERVATION SUPPORT SYSTEM

CROSS REFERENCE TO RELATED APPLICATIONS

This application is a National Stage of International Application No. PCT/JP2010/061900 filed Jul. 14, 2010, claiming priority based on Japanese Patent Application Nos. 2009-179938 and 2009-179939 filed Jul. 31, 2009, the contents of all of which are incorporated herein by reference in their entirety.

TECHNICAL FIELD

The present invention relates to a framework for managing online accommodation reservations and, particularly, to a function of supporting an accommodation reservation procedure carried out by a user representing a group.

BACKGROUND ART

Related Art 1

A framework for supporting a process of calling for participation before making reservations is known (for example, see Patent Literature 1). This framework assumes a case where a member (representative, organizer etc.) who represents various types of groups (circles, associations, divisions etc.) makes reservations for various types of services (lending of sports facilities, planning of competitions, provision of accommodations, lending of meeting rooms etc.) on a group-by-group basis ([0002] to [0004] in Patent Literature 1). Note that, those services are available on condition that "the number of participants is not less than a predetermined value".

Specifically, a reservation is made in the following steps (see FIG. 11, [0053] to [0054] in Patent Literature 1).

(1) Receive an application for a tentative reservation from a client device (S11).

(2) Acquire connection destination data or the like of the other members of a group related to the tentative reservation application from a group master file, and issue a tentative reservation notification to client devices owned by the members (S15, FIG. 9).

(3) Receive responses from the client devices of the other members and determine whether specific conditions are satisfied, such as whether there are a predetermined number or more of members who have made a response indicating their intention to receive the provision of a service (S17).

(4) When the conditions are satisfied, enter the ID of a service to be used, the ID of the group, the IDs of the members and the like into a reservation registration file (S18).

Related Art 2

A framework for sending a broadcast email to a plurality of email addresses input to an entry form on a Web page is known (for example, see Patent Literature 2). Specifically, the broadcast email is sent in the following steps (see FIG. 3 in Patent Literature 2).

(1) A user enters the other person's name, destination email address, message and the like into a specific input field on the Web page (FIG. 4, [0009]).

(2) A user terminal transmits data input in the above (1) to a server.

(3) A server device creates an email based on the data received in the above (2) and sends it to the input email address.

Related Art 3

A banquet reservation support system having a function of displaying the number of prospective participants to a banquet is known (for example, see Patent Literature 3). Specifically, the system counts the number of prospective participants each time a potential participant, who has received an approach from the organizer of the banquet through the system, makes a response about whether or not to participate through the system, and stores it into a specific storage means (see [0057] in Patent Literature 3). Then, the system tabulates the number of prospective participants each time it receives a request from the organizer or a participant and displays tabulated values in a graph as an intermediate result (or a final result) (see [0058], FIG. 5 in Patent Literature 3).

Related Art 4

In an online accommodation reservation site, a service to search for accommodations and a service to accept accommodation reservations are provided (for example, see Non Patent Literature 1). Use of this site allows searching "vacant rooms" by entering desired accommodation conditions (dates, area, price, number of people etc.), for example (see Non Patent Literature 2, Non Patent Literature 3). The site also allows making reservations for accommodation online (ditto as above).

CITATION LIST

Patent Literature

PTL 1: JP 2003-108840 A
PTL 2: JP 2002-169925 A
PTL 3: JP 2006-323805 A

Non Patent Literature

NPL1: Rakuten Travel, Inc., "Rakuten Travel", [online], Internet <URL: http://travel.rakuten.co.jp/index.html>

NPL2: Rakuten Travel, Inc., "How to Use Rakuten Travel—Flow of Domestic Accommodation Reservations", [online], Internet, <URL: http://travel.rakuten.co.jp/howto/domestic.html>

NPL3: Rakuten Travel, Inc., "Help—Domestic Accommodation Reservations", [online], Internet <URL: http://travel.rakuten.co.jp/help/kokunai/hotel/01.html>

SUMMARY OF INVENTION

Technical Problem

1. Accommodation Reservations On Group-By-Group Basis

FIG. 1 shows an accommodation reservation process using a conventional online accommodation reservation site. As shown in FIG. 1, a user (applicant) who uses the site searches accommodation plans by operating a terminal (S105), enters applicant information (S110), and applies for a reservation or arrangement (which is hereinafter referred to simply as "reservation") (S115). A reservation is thereby made. It is thus necessary that accommodation conditions (dates, accommodation, price, number of people etc.) are determined at the time of searching accommodation plans and selecting a desired plan.

Further, in general, the maximum number of guests (the upper limit of the number of people to stay) is set for each guest room of accommodation facilities. Therefore, in the case of booking an accommodation reservation by a group of a plurality of members, the number of guest rooms to be reserved is not determined unless the number of members to stay is determined, which hinders effective search of accommodation plans. On the other hand, each member of the group cannot decide whether or not to participate in the stay unless dates, accommodation, price and the like are determined to a certain extent.

Due to the above circumstances, the organizer of a group of a plurality of members needs to go through the following steps, for example, when booking an accommodation reservation.

(1) Set possible dates, accommodations, prices and the like using the search function of an online accommodation reservation site.

(2) Notify the possible dates, accommodations, prices and the like set in the above (1) to each member via email or the like and ask to return a response about whether or not to participate individually via email or the like.

(3) Summarize the responses of the above (2) by hand and determine accommodation conditions (dates, accommodation, price, number of people etc.).

(4) Search accommodation plans again using the online accommodation reservation site under the accommodation conditions determined in the above (3) (S105), and, if a reservation is possible, enter the applicant information (S110) and apply for a reservation (S115).

2. Limitation of Related Arts

The framework of the above <Related Art 1> accepts "tentative reservations" prior to final reservations to provide a period to solicit participants. Further, the framework automates processes such as solicitation of participants, receipt of responses to the solicitation, and tabulation of the number of participants. However, the framework of the above <Related Art 1> assumes a case of reserving a service which is available on condition that the number of participants is not less than a predetermined value". Accordingly, the number of participants aggregated during a tentative reservation is no more than data for determining whether a final reservation is possible or not (whether the service use conditions are satisfied or not). Thus, the above <Related Art 1> is not a framework on the assumption that the order quantity of services varies depending on the number of participants.

3. Problems to Be Solved by the Invention

An object of the present invention is to provide a framework that allows a user who represents a group and carries out an accommodation reservation procedure to solicit participating members and hold an accommodation at the same time.

Solution to Problem

A server system according to the present invention is a server system of a group reservation support system where a terminal of each member forming a group of a plurality of members and the server system supporting an accommodation plan reservation procedure carried out by an organizer representing the group via a Web page are connected through a communication network; which includes an accommodation plan information storage means for storing, in association with identification information of an accommodation plan, a maximum number of guests allowed for the accommodation plan and a stock quantity of guest rooms allocated for the accommodation plan; a reservation information storage means capable of storing, in association with a reservation number, identification information of an organizer, identification information of an accommodation plan, and an order quantity of the accommodation plan; a tentative reservation information storage means capable of storing, in association with a tentative reservation number, identification information of an organizer, identification information of an accommodation plan, a tentative order quantity of the accommodation plan, and number of members decided to participate; a tentative reservation application information receiving means for receiving the identification information of an organizer, the identification information of an accommodation plan, and the tentative order quantity of the accommodation plan from a terminal of the organizer; a tentative reservation information registration means for reading a stock quantity corresponding to the received identification information of the accommodation plan from the accommodation plan information storage means and, when the stock quantity is equal to or more than the received tentative order quantity, subtracting the tentative order quantity from the stock quantity stored in the accommodation plan information storage means and writing the received information items in association with a tentative reservation number into the tentative reservation information storage means; a member information specifying means for specifying email addresses of members other than the organizer using information received from the terminal of the organizer; an approval request email creation and sending means for creating an approval request email corresponding to the tentative reservation number and sending the approval request email to the specified email addresses; a response receiving means for, upon receiving a response identification code corresponding to a tentative reservation number from a terminal of a member other than the organizer, identifying a tentative reservation number corresponding to the response identification code and updating the number of members decided to participate corresponding to the tentative reservation number stored in the tentative reservation information storage means; a first reservation placement determination means for determining that a reservation of an order quantity 1 can be placed each time the updated number of members decided to participate reaches a multiple of the maximum number of guests allowed for an accommodation plan; and a reservation information partial registration means for reading identification information of an organizer and identification information of an accommodation plan corresponding to a tentative reservation number related to a tentative reservation determined that a reservation can be placed, and writing the identification information of the organizer, the identification information of the accommodation plan, and the order quantity 1 in association with a new reservation number into the reservation information storage means.

In the server system according to the present invention, the response receiving means may further read a tentative order quantity corresponding to the identified tentative reservation number from the tentative reservation information storage means and, when the updated number of members decided to participate is equal to a product of the maximum number of guests allowed for the accommodation plan and the tentative order quantity, discontinue receipt of responses for a tentative reservation related to the tentative reservation number.

The server system according to the present invention may further include a second reservation placement determination means for reading number of members decided to participate corresponding to a specified tentative reservation number from the tentative reservation information storage means when predetermined conditions are satisfied, and determining that a reservation of an order quantity 1 can be placed when the number of members decided to participate is not a multiple of the maximum number of guests allowed for an accommodation plan.

In the server system according to the present invention, the tentative reservation information storage means may be capable of further storing a reservation placement plan quantity, and the server system may further include a reservation placement quantity counting means for adding 1 to a reservation placement plan quantity corresponding to the tentative reservation number related to the tentative reservation determined that a reservation can be placed stored in the tentative reservation information storage means; and a partial reservation cancellation means for further reading identification information of an accommodation plan, a tentative order quantity and a reservation placement plan quantity corresponding to the specified tentative reservation number from the tentative reservation information storage means when the predetermined conditions are satisfied, and adding a difference between the tentative order quantity and the reservation placement plan quantity to a stock quantity corresponding to the identification information of the accommodation plan stored in the tentative reservation information storage means.

In the server system according to the present invention, the tentative reservation information storage means may be capable of further storing a response due date in association with the tentative reservation number, the tentative reservation application information receiving means may further receive a response due date, the tentative reservation information registration means may further write the received response due date in association with the tentative reservation number into the tentative reservation information storage means, and when a response due date corresponding to any of tentative reservation numbers stored in the tentative reservation information storage means has passed, the second reservation placement determination means may specify the tentative reservation number for which the response due date has passed and determine whether or not to place a reservation corresponding to the specified tentative reservation number.

In the server system according to the present invention, the reservation information storage means may be capable of storing each reservation number in association with a corresponding tentative reservation number, and the reservation information partial registration means may register the tentative reservation number related to the tentative reservation determined that a reservation can be placed and the new reservation number in association with each other into the reservation information storage means.

The server system according to the present invention may further include a tentative reservation confirmation page creation means for, upon receiving a page sending request designating a tentative reservation number from a terminal of any member, reading number of members decided to participate corresponding to the designated tentative reservation number from the tentative reservation information storage means, calculating a largest integer equal to or smaller than a quotient obtained by dividing the number of members decided to participate by a maximum number of guests allowed for an accommodation plan, and creating a tentative reservation confirmation page containing an item related to an expected finalization quantity of reservations using the integer; and a tentative reservation confirmation page sending means for sending the created tentative reservation confirmation page to the terminal of the member.

In the server system according to the present invention, the tentative reservation information storage means may be capable of further storing an email address of each member and an approval flag indicating whether the each member has given approval or not in association with the tentative reservation number, the server system may further include a member information registration means for writing information specifying a member corresponding to each specified email address in association with the tentative reservation number into the tentative reservation information storage means, and, in the server system, the approval request email creation and sending means may create an approval request email further containing member identification data corresponding to information specifying a member and send the approval request email to an email address of a member corresponding to each member identification data, upon receiving the response identification code and the member identification data from the terminal of the member, the response receiving means may further identify a member corresponding to the member identification data and set the approval flag corresponding to the identified tentative reservation number stored in the tentative reservation information storage means and information specifying the identified member, and the tentative reservation confirmation page creation means may further read the information specifying each member corresponding to the designated tentative reservation number and the approval flag from the tentative reservation information storage means and create a tentative reservation confirmation page further containing an item related to a response status of each member using the information specifying each member and the approval flag.

In the server system according to the present invention, if the identified member is an organizer, the tentative reservation confirmation page creation means may create a tentative reservation confirmation page further containing a reservation finalization element for finalizing whether or not to place a reservation for a tentative reservation related to the designated tentative reservation number, the server system may further include a reservation finalization request receiving means for receiving a reservation finalization request at least containing identification data of the reservation finalization element from the terminal of the organizer, and in the server system, upon receiving a reservation finalization request, a first order quantity finalization means may specify a tentative reservation number corresponding to the reservation finalization request and finalize an order quantity corresponding to the specified tentative reservation number.

The server system according to the present invention may further include a facility information storage means for storing, in association with identification information of a facility, a date of stay and a guest room type, a vacant room quantity of the room type, and, in the server system, the accommodation plan information storage means may further store identification information of a facility, a date of stay and a guest room type in association with the identification information of an accommodation plan, and the server system may further include a vacant room quantity update means for, upon occurrence of a change in any stock quantity stored in the tentative reservation information storage means due to certain update processing, reading a set of identification information of a facility, a date of stay and a guest room type corresponding to the changed stock quantity from the accommodation plan information storage means and performing same update processing as the update processing on a vacant room quantity corresponding to the set stored in the facility information storage means.

A group reservation support method according to the present invention is a group reservation support method in a group reservation support system where a terminal of each member forming a group of a plurality of members and a server system supporting an accommodation plan reservation procedure carried out by an organizer representing the group via a Web page are connected through a communication network, and the server system including an accommodation plan information storage means for storing, in association with identification information of an accommodation plan, a maximum number of guests allowed for the accommodation plan and a stock quantity of guest rooms allocated for the accommodation plan, a reservation information storage means capable of storing, in association with a reservation number, identification information of an organizer, identification information of an accommodation plan, and an order quantity of the accommodation plan, and a tentative reservation information storage means capable of storing, in association with a tentative reservation number, identification information of an organizer, identification information of an accommodation plan, a tentative order quantity of the accommodation plan, and number of members decided to participate executes the method including a tentative reservation application information receiving step of receiving the identification information of an organizer, the identification information of an accommodation plan, and the tentative order quantity of the accommodation plan from a terminal of the organizer; a tentative reservation information registration step of reading a stock quantity corresponding to the received identification information of the accommodation plan from the accommodation plan information storage means and, when the stock quantity is equal to or more than the received tentative order quantity, subtracting the tentative order quantity from the stock quantity stored in the accommodation plan information storage means and writing the received information items in association with a tentative reservation number into the tentative reservation information storage means; a member information specifying step of specifying email addresses of members other than the organizer using information received from the terminal of the organizer; an approval request email creation and sending step of creating an approval request email corresponding to the tentative reservation number and sending the approval request email to the specified email addresses; a response receiving step of, upon receiving a response identification code corresponding to a tentative reservation number from a terminal of a member other than the organizer, identifying a tentative reservation number corresponding to the response identification code and updating the number of members decided to participate corresponding to the tentative reservation number stored in the tentative reservation information storage means; a first reservation placement determination step of determining that a reservation of an order quantity 1 can be placed each time the updated number of members decided to participate reaches a multiple of the maximum number of guests allowed for an accommodation plan; and a reservation information partial registration step of reading identification information of an organizer and identification information of an accommodation plan corresponding to a tentative reservation number related to a tentative reservation determined that a reservation can be placed, and writing the identification information of the organizer, the identification information of the accommodation plan, and the order quantity 1 in association with a new reservation number into the reservation information storage means.

A group reservation support program according to the present invention is a group reservation support program in a group reservation support system where a terminal of each member forming a group of a plurality of members and a server system supporting an accommodation plan reservation procedure carried out by an organizer representing the group via a Web page are connected through a communication network, the program causing the server system including an accommodation plan information storage means for storing, in association with identification information of an accommodation plan, a maximum number of guests allowed for the accommodation plan and a stock quantity of guest rooms allocated for the accommodation plan, a reservation information storage means capable of storing, in association with a reservation number, identification information of an organizer, identification information of an accommodation plan, and an order quantity of the accommodation plan, and a tentative reservation information storage means capable of storing, in association with a tentative reservation number, identification information of an organizer, identification information of an accommodation plan, a tentative order quantity of the accommodation plan, and number of members decided to participate to execute a tentative reservation application information receiving step of receiving the identification information of an organizer, the identification information of an accommodation plan, and the tentative order quantity of the accommodation plan from a terminal of the organizer; a tentative reservation information registration step of reading a stock quantity corresponding to the received identification information of the accommodation plan from the accommodation plan information storage means and, when the stock quantity is equal to or more than the received tentative order quantity, subtracting the tentative order quantity from the stock quantity stored in the accommodation plan information storage means and writing the received information items in association with a tentative reservation number into the tentative reservation information storage means; a member information specifying step of specifying email addresses of members other than the organizer using information received from the terminal of the organizer; an approval request email creation and sending step of creating an approval request email corresponding to the tentative reservation number and sending the approval request email to the specified email addresses; a response receiving step of, upon receiving a response identification code corresponding to a tentative reservation number from a terminal of a member other than the organizer, identifying a tentative reservation number corresponding to the response identification code and updating the number of members decided to participate corresponding to the tentative reservation number stored in the tentative reservation information storage means; a first reservation placement determination step of determining that a reservation of an order quantity 1 can be placed each time the updated number of members decided to participate reaches a multiple of the maximum number of guests allowed for an accommodation plan; and a reservation information partial registration step of reading identification information of an organizer and identification information of an accommodation plan corresponding to a tentative reservation number related to a tentative reservation determined that a reservation can be placed, and writing the identification information of the organizer, the identification information of the accommodation plan, and the order quantity 1 in association with a new reservation number into the reservation information storage means.

A computer-readable recording medium according to the present invention stores a group reservation support program in a group reservation support system where a terminal of each member forming a group of a plurality of members and a server system supporting an accommodation plan reservation procedure carried out by an organizer representing the group via a Web page are connected through a communication network, the program causing the server system including an accommodation plan information storage means for storing, in association with identification information of an accommodation plan, a maximum number of guests allowed for the accommodation plan and a stock quantity of guest rooms allocated for the accommodation plan, a reservation information storage means capable of storing, in association with a reservation number, identification information of an organizer, identification information of an accommodation plan, and an order quantity of the accommodation plan, and a tentative reservation information storage means capable of storing, in association with a tentative reservation number, identification information of an organizer, identification information of an accommodation plan, a tentative order quantity of the accommodation plan, and number of members decided to participate to execute a tentative reservation application information receiving step of receiving the identification information of an organizer, the identification information of an accommodation plan, and the tentative order quantity of the accommodation plan from a terminal of the organizer; a tentative reservation information registration step of reading a stock quantity corresponding to the received identification information of the accommodation plan from the accommodation plan information storage means and, when the stock quantity is equal to or more than the received tentative order quantity, subtracting the tentative order quantity from the stock quantity stored in the accommodation plan information storage means and writing the received information items in association with a tentative reservation number into the tentative reservation information storage means; a member information specifying step of specifying email addresses of members other than the organizer using information received from the terminal of the organizer; an approval request email creation and sending step of creating an approval request email corresponding to the tentative reservation number and sending the approval request email to the specified email addresses; a response receiving step of, upon receiving a response identification code corresponding to a tentative reservation number from a terminal of a member other than the organizer, identifying a tentative reservation number corresponding to the response identification code and updating the number of members decided to participate corresponding to the tentative reservation number stored in the tentative reservation information storage means; a first reservation placement determination step of determining that a reservation of an order quantity 1 can be placed each time the updated number of members decided to participate reaches a multiple of the maximum number of guests allowed for an accommodation plan; and a reservation information partial registration step of reading identification information of an organizer and identification information of an accommodation plan corresponding to a tentative reservation number related to a tentative reservation determined that a reservation can be placed, and writing the identification information of the organizer, the identification information of the accommodation plan, and the order quantity 1 in association with a new reservation number into the reservation information storage means.

Advantageous Effects of Invention

The server system according to the present invention receives a tentative reservation application from an organizer, requests approval from members, and receives responses to the request for approval from the members. Then, the server system makes a reservation of an order quantity of 1 each time the number of participants in stay reaches the multiple of the maximum number of guests for the accommodation plan related to the tentative reservation. Thus, with use of the server system according to the present invention, an organizer who represents a group and carries out an accommodation reservation procedure can solicit participating members and hold an accommodation at the same time. On the other hand, participants can definitely participate if giving approval.

BRIEF DESCRIPTION OF DRAWINGS

FIG. 4 is an explanatory view of data items in a database (embodiment).

FIG. 5 is an explanatory view of data items in a database (embodiment).

FIG. 7 is an explanatory view of data items to be transmitted and received (embodiment).

FIG. 16 is a display example of a tentative reservation confirmation page at the time of additional member registration (embodiment).

FIG. 17 is a display example of a tentative reservation confirmation page after additional member registration (embodiment).

FIG. 18 is a flowchart showing a batch process (embodiment).

FIG. 19 is an explanatory view of extraction conditions, order quantity and cancellation quantity (embodiment).

DESCRIPTION OF EMBODIMENTS

Definition

Accommodation plans: units of a reservation target (order target) in an online accommodation reservation site. At least one night of accommodation service in a specific guest room (or a guest room of a specific room type) is mandatory, and an optional service such as meals may be included. Note that, in this embodiment, it is assumed that an accommodation plan and a room type have a one-to-one or many-to-one correspondence.

Tentative reservations: to preferentially hold an accommodation plan within certain conditions. When transition to reservations is not accomplished, it is possible to cancel all or part of the tentative reservations.

Final reservations: synonymous with normal reservations. The term "final reservations" is especially used in some cases for the sake of contrast with "tentative reservations".

Group: a population composed of a plurality of users; for example, club, circle, association, seminar, laboratory, division and the like.

Member: a user who belongs to a group.

Organizer: a member who represents a group. In this embodiment, it is a member who represents a group and carries out an accommodation reservation procedure.

Embodiment

1. Outline

A system according to this embodiment is a system that manages an online accommodation reservation site and provides a user with a service that accepts reservations for accommodations (accommodation reservation service). A main feature is to accept "tentative reservations" to accommodate all members prior to reservations (final reservations) for accommodation and, after obtaining approval from n number (n is a natural number) of members specified by an organizer, place reservations for accommodation. Thus, with use of the system according to this embodiment, an organizer who represents a group and carries out an accommodation reservation procedure can solicit participating members and hold an accommodation at the same time.

Figure 1:
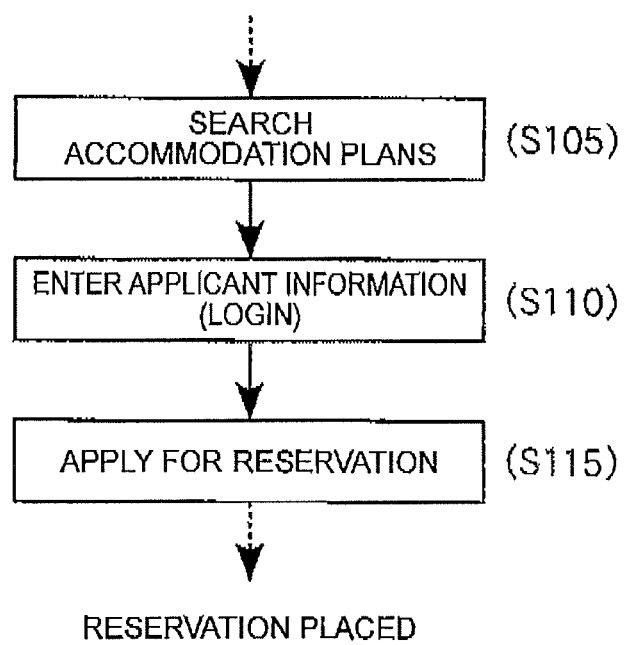
FIG. 1 is a flowchart showing an accommodation reservation process (related art).
Figure 2:
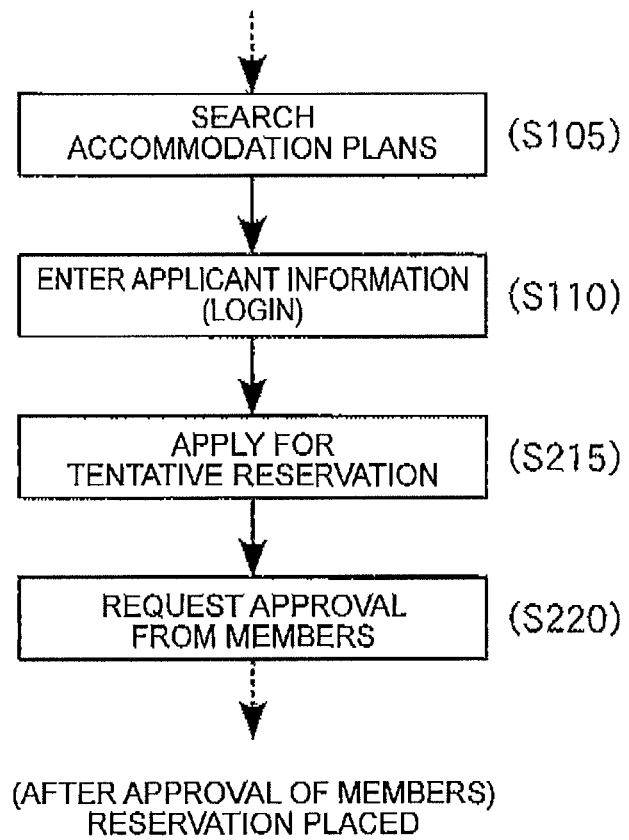
FIG. 2 is a flowchart showing an accommodation reservation process (embodiment).

FIG. 2 shows an accommodation reservation procedure using the system according to the embodiment. As shown in FIG. 2, an organizer searches accommodation plans by operating a terminal (S105), enters applicant information (S110), applies for a tentative reservation (S215), and requests approval from members (S220). After that, the reservation is placed by approval of each member requested to give approval or the like. Note that, in FIG. 2, processing denoted by the same reference symbol as in FIG. 1 is the same processing. Further, processing after placement of a reservation is the same as that of related art (for example, <Related Art 4>).

2. System Configuration

Figure 3:
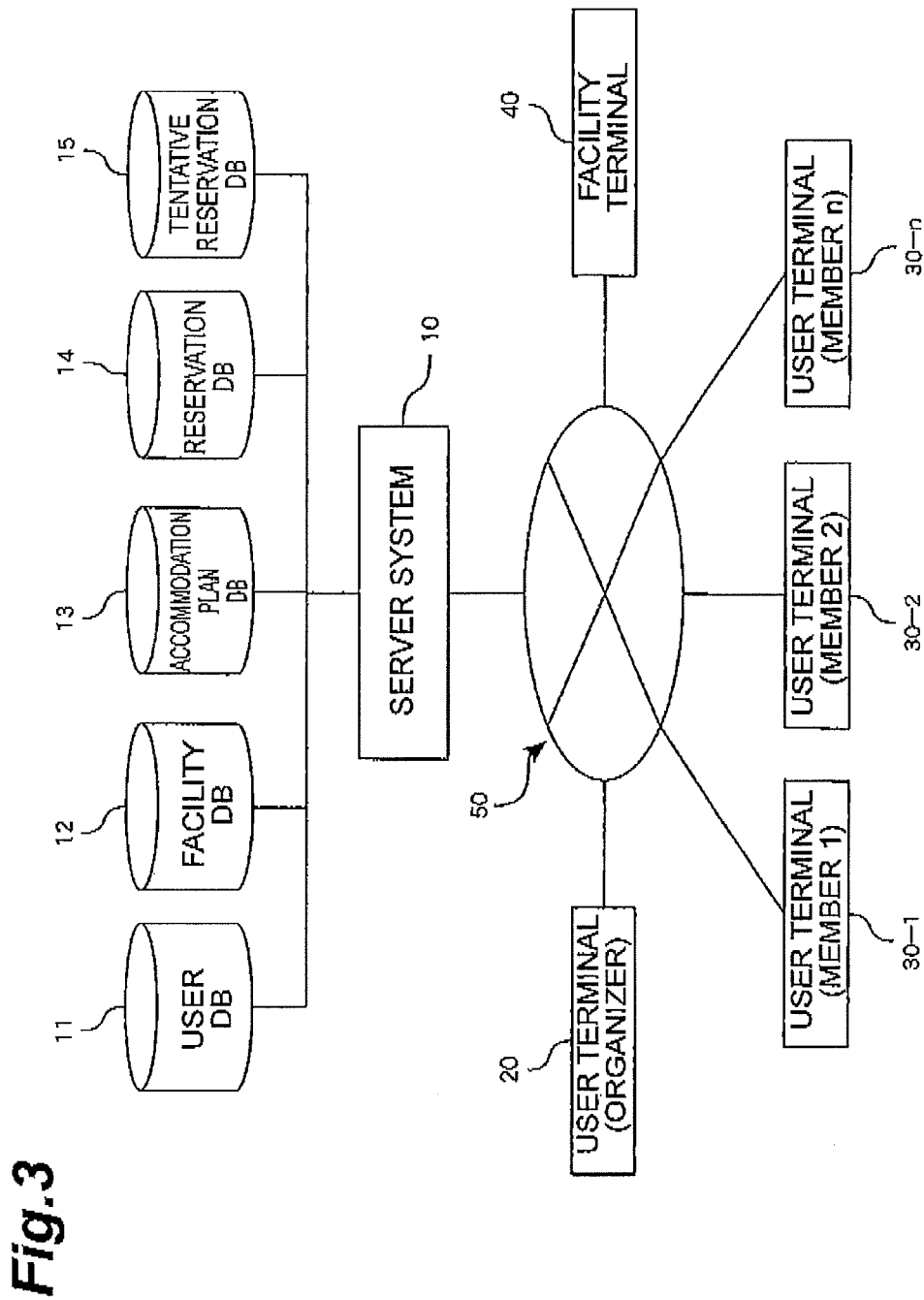
FIG. 3 is a block diagram showing a system configuration (embodiment).

FIG. 3 shows a configuration of the system according to the embodiment. As shown in FIG. 3, the system according to the embodiment is composed of a server system 10, a user terminal 20 of an organizer, user terminals 30 (1 to n) of members other than the organizer, and a facility terminal 40. Further, the server system 10 includes a user DB 11, a facility DB 12, an accommodation plan DB 13, a reservation DB 14, and a tentative reservation DB 15. The server system 10, the user terminal 20, the user terminals 30 (1 to n) and the facility terminal 40 are connected to one another through a communication network (in this embodiment, Internet 50).

2-1. Server System

In FIG. 3, the server system 10 is a cluster of servers that manage the accommodation reservation service. The server system 10 includes a Web server that has Web page creation and sending functions, a mail server that has email creation and sending functions, a DB server that manages a database, a batch processing server that executes batch processing, and other necessary AP servers.

(a) User DB

In FIG. 3, the user DB 11 is a database that stores information of users who use the accommodation reservation service. FIG. 4(a) shows major items of user information. As shown in FIG. 4(a), one piece of user information includes "user ID", "password" and "email address".

(b) Facility DB

In FIG. 3, the facility DB 12 is a database that stores information related to accommodation facilities which offer guest rooms in the accommodation reservation service. In this embodiment, the facility DB 12 stores a plurality of pieces of facility basic information, guest room basic information, guest room allocation information, and vacancy management information, which are associated through a key item.

FIG. 4(b-1) shows major items of facility basic information. As shown in FIG. 4(b-1), one piece of facility basic information includes "facility ID", "password", "email address", "tentative reservation booking period" and "tentative reservation no-booking period". The "tentative reservation booking period" is the maximum number of days from placement of a tentative reservation to determination whether or not to place a final reservation. The "tentative reservation no-booking period" is the number of days of the period which is just before date of stay and during which tentative reservations cannot be booked. In this embodiment, those periods can be arbitrarily set by each facility.

FIG. 4(b-2) shows major items of guest room basic information. As shown in FIG. 4(b-2), one piece of guest room basic information includes "facility ID", "room type" and "capacity". The "room type" is a code indicating a room type of a guest room (Japanese room/Western room, size etc.).

FIG. 4 (b-3) shows major items of guest room allocation information. As shown in FIG. 4 (b-3), one piece of guest room allocation information includes "facility ID", "date of stay", "room type", "accommodation plan ID", and "allocated quantity". The "allocated quantity" indicates how many guest rooms of each room type are allocated for which accommodation plan for each day of stay.

FIG. 4(b-4) shows major items of vacancy management information. As shown in FIG. 4(b-4), one piece of vacancy management information includes "facility ID", "date of stay", "room type", "vacant room quantity", "reserved room quantity", and "tentatively reserved room quantity". The "vacant room quantity" is the number of guest rooms which are not reserved or tentatively reserved. The "number of reserved room" and "number of tentatively reserved room" are the number of guest rooms which are reserved and tentatively reserved, respectively.

(c) Accommodation Plan DB

In FIG. 3, the accommodation plan DB 13 is a database that stores information of accommodation plans which can be reserved (ordered) in the accommodation reservation service. In this embodiment, the accommodation plan DB 13 stores a plurality of pieces of accommodation plan basic information and stock management information, which are associated through a key item.

FIG. 4(c-1) shows major items of accommodation plan basic information. As shown in FIG. 4(c-1), one piece of accommodation plan basic information includes "accommodation plan ID", "facility ID", "date of stay", "room type", and "maximum number of guests". The "maximum number of guests" is the maximum number of guests allowed to stay for a room type corresponding to the accommodation plan, which is equivalent to "capacity" of the guest room basic information (FIG. 4(b-2)).

FIG. 4(c-2) shows major items of stock management information. As shown in FIG. 4(c-2), one piece of stock management information includes "accommodation plan ID" and "stock quantity". The "stock quantity" is the number of accommodation plans which are not reserved or tentatively reserved.

(d) Reservation DB

In FIG. 3, the reservation DB 14 is a database that stores reservation information of the accommodation reservation service. FIG. 5(d) shows major items of reservation information. As shown in FIG. 5(d), one piece of reservation information includes "reservation number", "tentative reservation number", "user ID" of an organizer, "accommodation plan ID", and "order quantity". Note that, in this embodiment, processing after the reservation information is registered into the reservation DB 14 is the same as that of the online accommodation reservation site in related art (the above <Related Art 4>), unless otherwise noted.

(e) Tentative Reservation DB

In FIG. 3, the tentative reservation DB 15 is a database that stores information related to tentative reservations in the accommodation reservation service. In this embodiment, the tentative reservation DB 15 stores a plurality of pieces of tentative reservation basic information, tentative reservation management information, member basic information, and member management information, which are associated through a key item.

FIG. 5(e-1) shows major items of tentative reservation basic information. As shown in FIG. 5(e-1), one piece of tentative reservation basic information includes "tentative reservation number", "user ID" of an organizer, "accommodation plan ID", "tentative order quantity", "maximum number of guests", "response due date", "message file path" and "tentative reservation identification data". The "maximum number of guests" is the maximum number of guests allowed for an accommodation plan related to the tentative reservation, which corresponds to "maximum number of guests" of the accommodation plan basic information (FIG. 4(c-1)). The "tentative reservation identification data" is data (encrypted data, hash value etc.) for identifying a tentative reservation number. Note that "maximum number of guests" of the accommodation plan basic information (FIG. 4(c-1)) may be read out each time needed, without storing "maximum number of guests" in the tentative reservation basic information.

FIG. 5(e-2) shows major items of tentative reservation management information. As shown in FIG. 5(e-2), one piece of tentative reservation management information includes "tentative reservation number", "number of members decided to participate", "reservation placement plan quantity", "number of unanswered members", and "tentative reservation status". The "number of members decided to participate" is the number of members who have decided to participate in the stay related to the tentative reservation. The "tentative reservation status" is a category ("under request" (default), "under confirmation", "end", "closed", "canceled" etc.) indicating the progress of processing related to tentative reservations. In this embodiment, the default value of the "number of members decided to participate" is 1, with an organizer included in advance in the number of participants. Note that the default value of the "number of members decided to participate" may be 0, to obtain approval for participation from an organizer as well. Further, 1 may be added at the time of reading the "number of members decided to participate".

FIG. 5(e-3) shows major items of member basic information. As shown in FIG. 5(e-3), one piece of member basic information includes "tentative reservation number", "member ID", "nickname", "email address" and "member identification data". The "member identification data" is data (encrypted data, hash value etc.) for identifying information that specifies members (for example, "member ID", "nickname" or "email address"). Note that "nickname" or "email address" may be used as "member ID".

FIG. 5(e-4) shows major items of member management information. As shown in FIG. 5(e-4), one piece of member management information includes "tentative reservation number", "member ID", "response flag" and "approval flag". The "response flag" is a flag indicating whether the member has answered a response or not, and a response has been answered when it is significant. The "approval flag" is a flag indicating whether the member has given approval or not, and approval has been given when it is significant. By combination of "response flag" and "approval flag", unanswered, not approved and approved are represented as follows.

Unanswered when "response flag" is not significant
Not approved when "response flag" is significant and "approval flag" is not significant
Approved when "response flag" and "approval flag" are both significant

2-2. User Terminal

In FIG. 3, the user terminal 20 and the user terminals 30 (1 to n) are terminals that are used by an organizer and members other than the organizer who use the accommodation reservation service. The user terminal 20 and the user terminals 30 have a Web browser and are capable of displaying a Web page (data in HTML format etc.) received from the server system 10 on a display. Further, the user terminal 20 and the user terminals 30 have a mailer and are capable of displaying an email received from the server system 10 on a display. Note that the user terminal 20 and the user terminals 30 may be existing information processing terminals having communication functions (for example, an electronic computer such as a personal computer, mobile phone unit or the like).

2-3. Facility Terminal

In FIG. 3, the facility terminal 40 is a terminal that is used in a facility that offers guest rooms to the accommodation reservation service. The facility terminal 40 has a Web browser and is capable of displaying a Web page (data in HTML format etc.) received from the server system 10 on a display. Further, the facility terminal 40 has a mailer and is capable of displaying an email received from the server system 10 on a display. Note that the facility terminal 40 may be an existing information processing terminal having communication functions (for example, an electronic computer such as a personal computer or the like).

3. Data Processing

Data processing in the system according to the embodiment is broadly classified into four as follows.

(1) Acceptance of Tentative Reservation Application
(2) Receipt of Responses
(3) Checking of Response Status
(4) Batch Processing

3-1. Acceptance of Tentative Reservation Application

Figure 6:
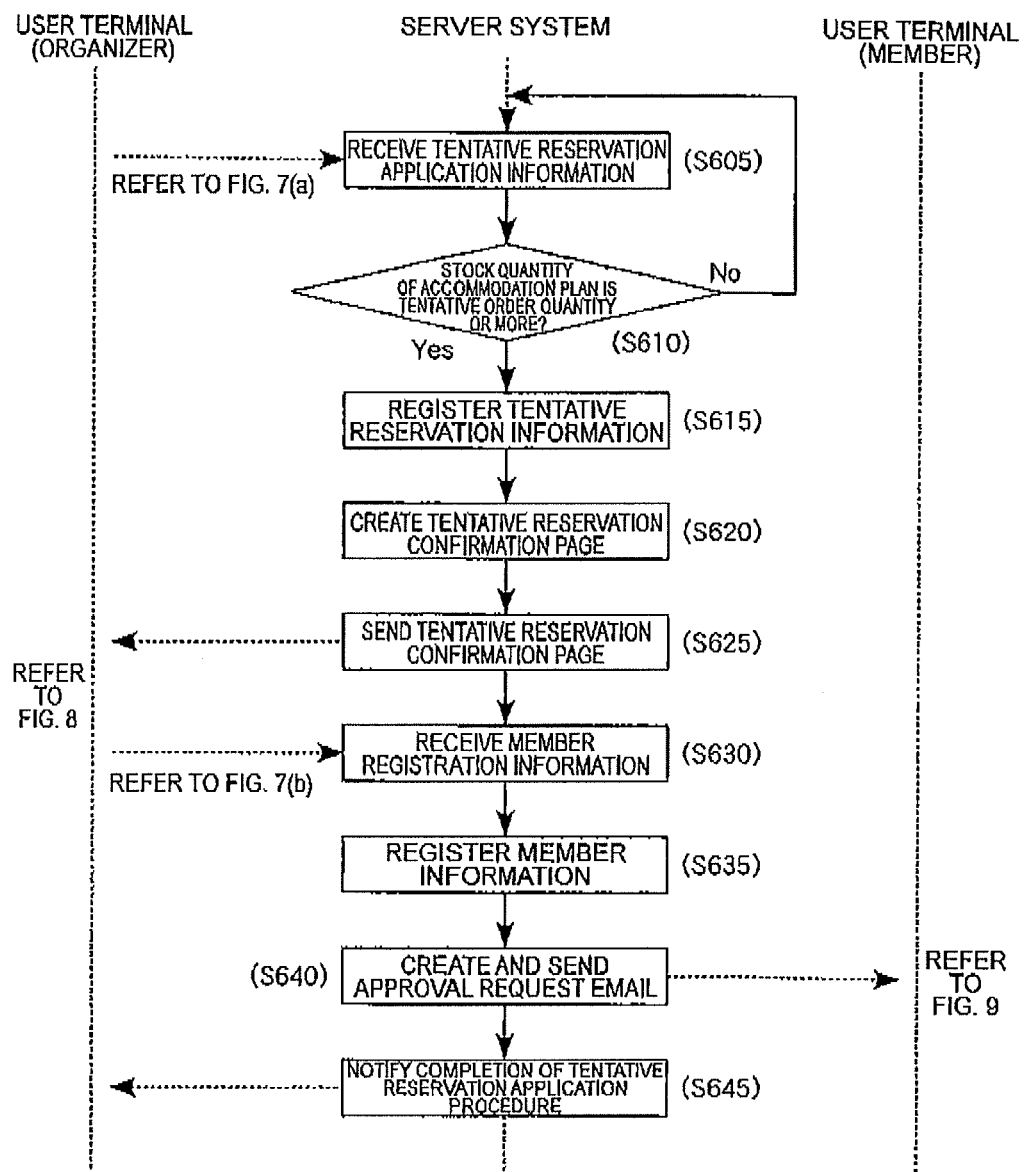
FIG. 6 is a flowchart showing a tentative reservation application accepting process (embodiment).

A tentative reservation application accepting process by the server system 10 is described hereinafter with reference to FIGS. 6 to 9 (particularly, the flowchart of FIG. 6). In FIG. 6, other drawing numbers to be referred to are shown. Refer to such other drawings according to need.

(a) Tentative Reservation Application Accepting Process

FIG. 6 shows a tentative reservation application accepting process. Hereinafter, a case where registration of tentative reservation information is followed by registration of member information and sending of an approval request email is described by way of illustration. Note that registration of member information can be performed at any time during a tentative reservation period (within the tentative reservation booking period and outside the tentative reservation no-booking period; a period set by an organizer or a period set automatically) after registration of tentative reservation information. As shown in FIG. 6, the server system 10 accepts a tentative reservation application by the following steps (11) and (12).

(11) Upon receiving tentative reservation application information from the user terminal 20 (S605, FIG. 7(*a*)), refer to the stock management information of the accommodation plan DB 13 and determine whether a stock quantity of an accommodation plan related to the application is equal to or more than a tentative order quantity or not (S610). When the stock quantity is equal to or more than the tentative order quantity (Yes in S610), assign a new tentative reservation number and register tentative reservation information into the tentative reservation DB 15 (S615). Further, in this step, subtract the tentative order quantity from the stock quantity of the accommodation plan related to the application in the stock management information of the accommodation plan DB 13. On the other hand, when the stock quantity is less than the tentative order quantity (No in S610), display a message indicating that the tentative reservation application is not acceptable, for example, and recommend a change of the tentative order quantity or accommodation plan.

Figure 8:
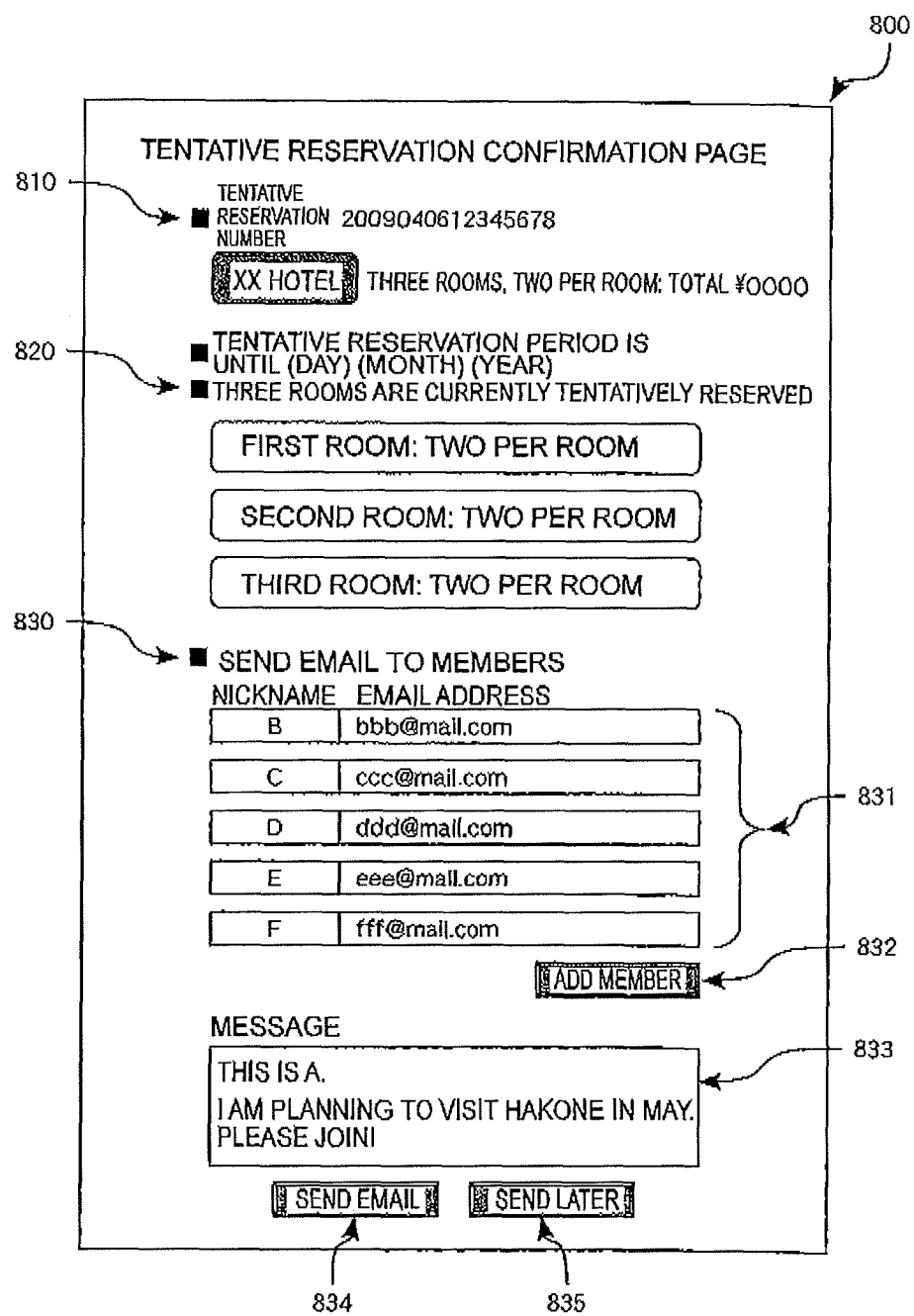
FIG. 8 is a display example of a tentative reservation confirmation page at the time of member registration (embodiment).

(12) Create a tentative reservation confirmation page (S620) and send it to the user terminal 20 (S625, FIG. 8). Upon receiving member registration information from the user terminal 20 through the tentative reservation confirmation page (S630, FIG. 7(*b*)), register member information into the tentative reservation DB 15 (S635), create an approval request email and send it to email addresses of members (S640, FIG. 9). After completion of the above process, notify the user terminal 20 that the tentative reservation application procedure has completed (S645). The notification may be given via email, for example.

(b) Tentative Reservation Application Information

FIG. 7(*a*) shows major items of tentative reservation application information. As shown in FIG. 7(*a*), one piece of tentative reservation application information includes "user ID" of an organizer, "accommodation plan ID", "tentative order quantity", and "response due date". The "response due date" is the last day of a tentative reservation period (which is a period set within the tentative reservation booking period and outside the tentative reservation no-booking period). Note that the items of tentative reservation application information may be received all at once or one at a time.

(c) Tentative Reservation Confirmation Page

FIG. 8 is a display example of a tentative reservation confirmation page at the time of member registration. As shown in FIG. 8, a tentative reservation confirmation page 800 contains areas 810, 820 and 830. In the area 810, information related to the tentative reservation is displayed. The displayed information is a link to a detailed page of an accommodation facility (or a guest room) related to the tentative reservation, a total price, a tentative reservation period and the like, for example. In the area 820, information about guest rooms which are tentatively reserved is displayed.

In the area 830, it is possible to create an approval request email for members expected to participate and request the sending of the email. A process of requesting the sending of the approval request email is as follows.

(1) Enter nicknames and email addresses of members into an input field 831.

(2) Click a button 832 and add a new field to the input field 831 according to need (3) Enter a message to appear in the approval request email into an input field 833.

(4) Click a button 834 and request the registration of member information and the sending of the approval request email. Alternatively, click a button 835 and request the registration of member information only.

(d) Member Registration Information

FIG. 7(*b*) shows major items of member registration information. As shown in FIG. 7(*b*), one piece of member registration information includes "tentative reservation number", "message", and "nickname" and "email address" of members (1, 2, . . . ). Note that, in the case of specifying a tentative reservation number using information for specifying a tentative reservation number (for example, a cookie session ID etc.), the above "tentative reservation number" may be excluded.

(e) Approval Request Email

Figure 9:
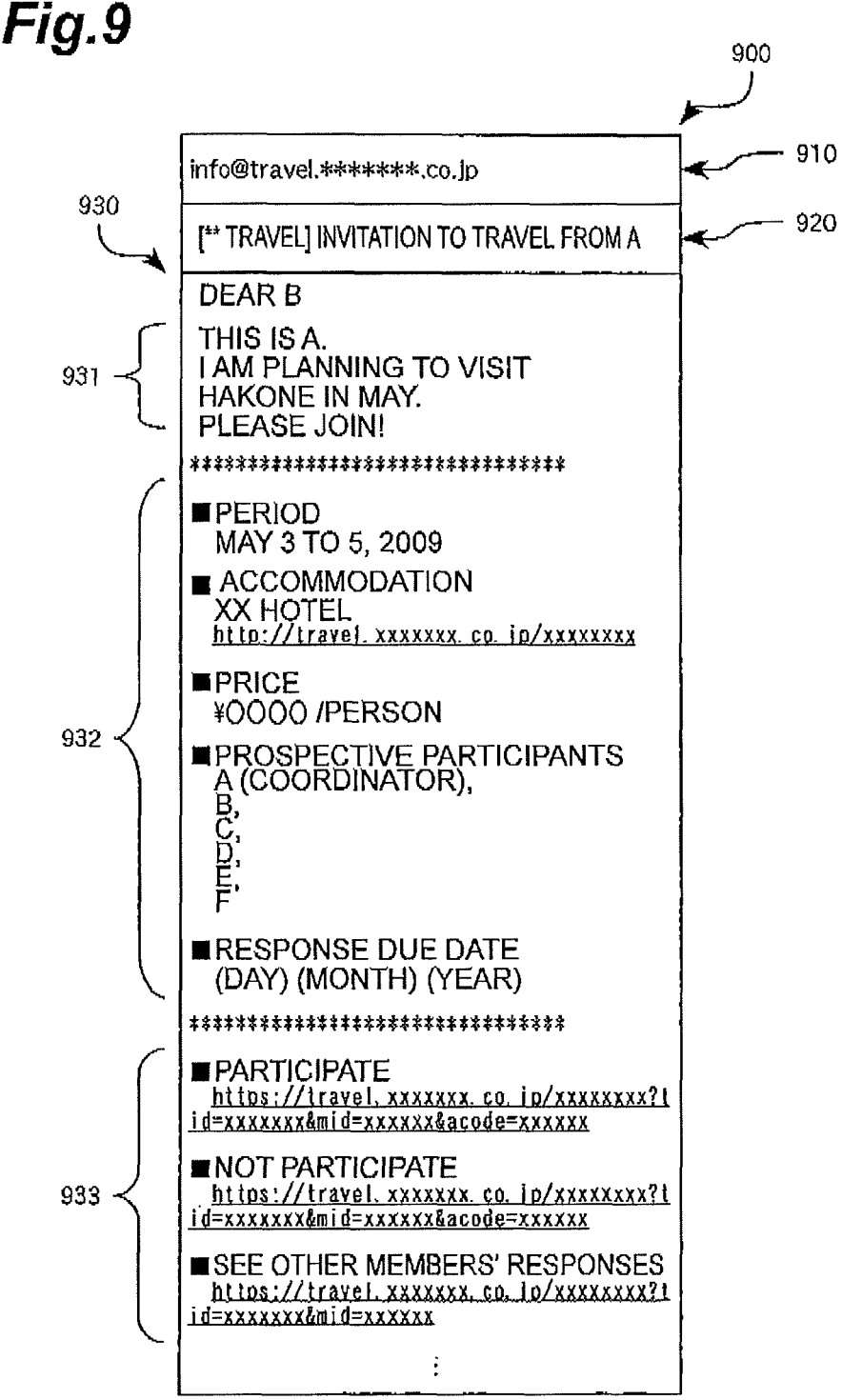
FIG. 9 is a display example of an approval request email (embodiment).

FIG. 9 shows a display example of an approval request email. As shown in FIG. 9, an approval request email 900 contains sender information 910, a title 920 and a body 930. The sender information 910 is an email address or the like of a sender (which is the accommodation reservation service in this example). In the title 920, it is explicitly indicated that the email is an invitation from an organizer ("A"), for example. In the body 930, a message 931 from the organizer ("A"), information 932 related to a tentative reservation and URLs 933 for response and the like are displayed.

Each of the URLs 933 contains "tentative reservation identification data" and "member identification data" as parameters. Further, some of the URLs 933 further contains a response code (parameter) as a parameter. A member can respond to the approval request from the organizer by clicking any of the URLs 933. The correspondence between the display in the body and the response code is as follows.

"Participate": contain a response code indicating "approved"

"Not participate": contain a response code indicating "not approved"

"See other members' responses": not contain a response code

3-2. Receipt of Response

Figure 10:
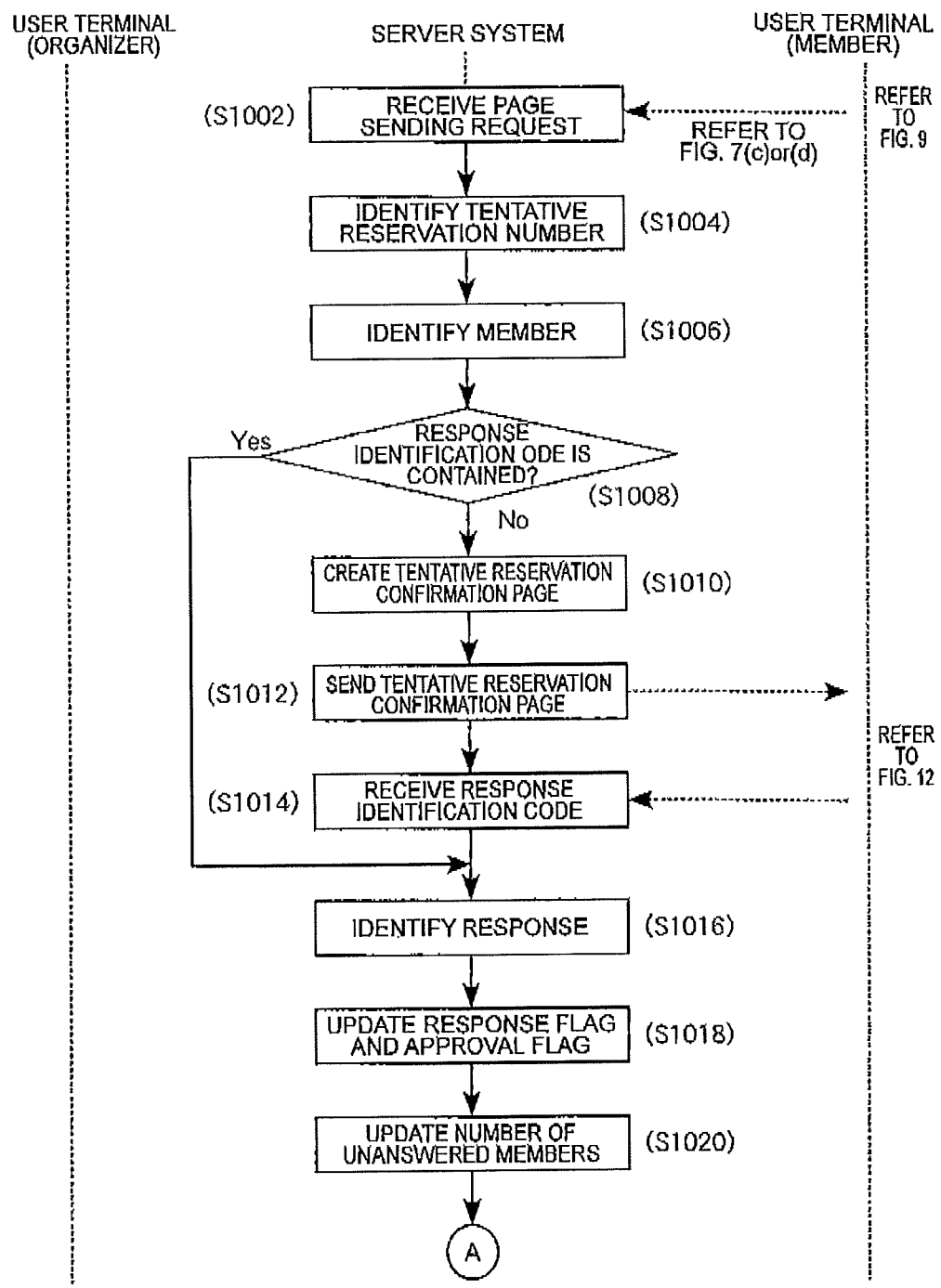
FIG. 10 is a flowchart showing a response receiving process (embodiment).
Figure 11:
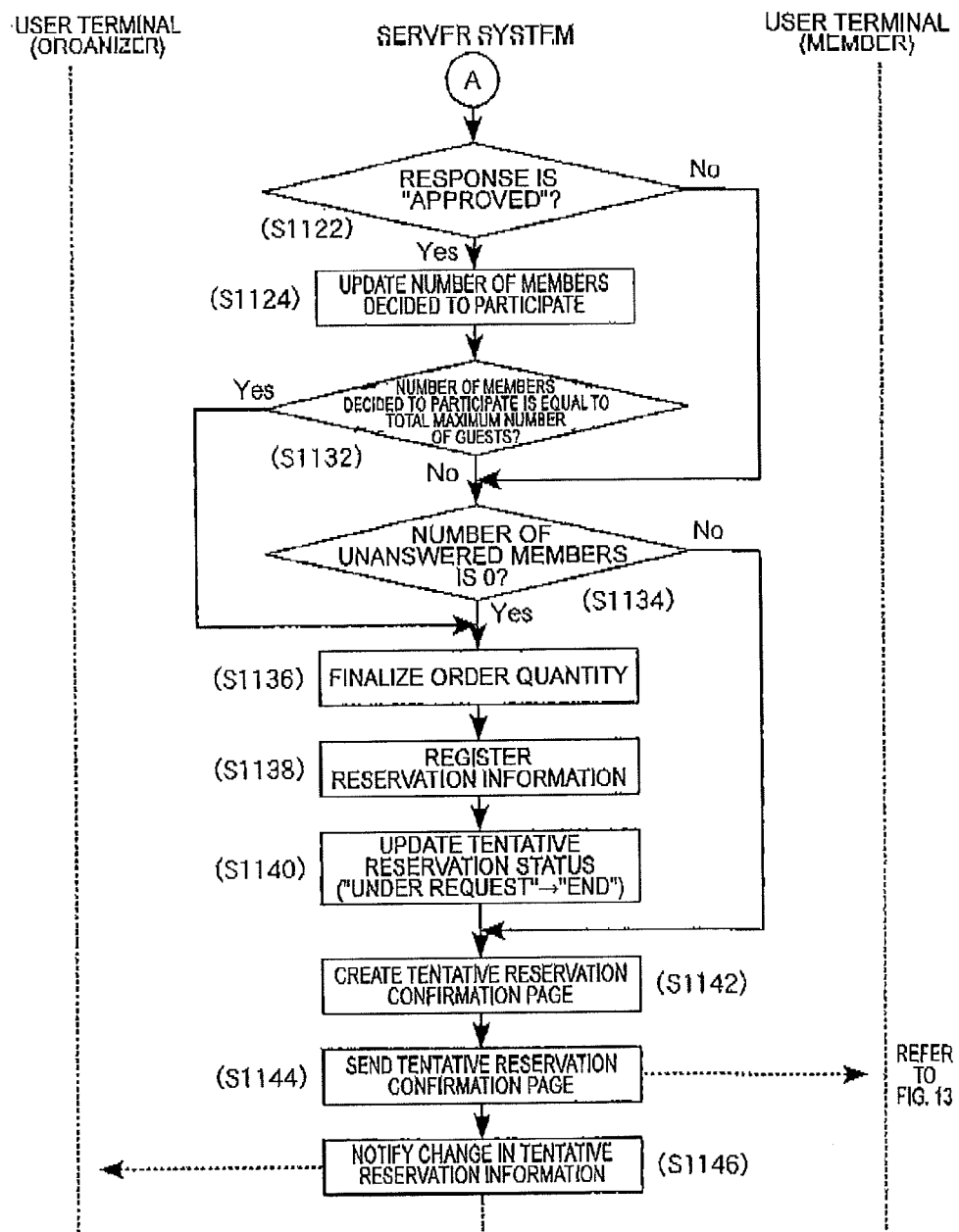
FIG. 11 is a flowchart showing a response receiving process (embodiment).

A response receiving process by the server system 10 is described hereinafter with reference to FIGS. 10 to 13 (particularly, the flowcharts of FIGS. 10 and 11). In FIGS. 10 and 11, other drawing numbers to be referred to are shown. Refer to such other drawings according to need.

(a) Response Receiving Process

FIGS. 10 and 11 show a response receiving process. Hereinafter, a case where update of tentative reservation information is followed by condition determination based on answers in responses and the number of responses and then registration of reservation information is described by way of illustration. This process allows a reservation to be booked at relatively early times during the tentative reservation period even when the response due date has not yet passed. Further, in the case of soliciting more participants than the total of the maximum number of guests (tentative order quantity*maximum number of guests), for example, participants may be determined on a first-come, first-served basis. Note that condition determination processing based on answers in responses and the number of responses and the reservation information registration processing may be skipped. As shown in FIGS. 10 and 11, the server system 10 receives responses by the following steps (21) to (26).

(21) Upon receiving a page sending request from the user terminal 30 (S1002, FIG. 7(c) or (d)), refer to the tentative reservation basic information of the tentative reservation DB 15 and identify a tentative reservation number corresponding to the tentative reservation identification data (S1004). Next, refer to the member basic information of the tentative reservation DB 15 and identify a member corresponding to the member identification data (S1006). Note that, in any of the following cases, it is preferred to reject the acceptance of a response by indicating the reason.

When the response due date has passed (when a tentative reservation status corresponding to the identified tentative reservation number is not "under request")

When the response has been made (when "response flag" corresponding to the identified member is significant)

(22) Determine whether a response identification code is contained in the received page sending request (S1008). When the response identification code is not contained (No in S1008), create a tentative reservation confirmation page (S1010), send it to the user terminal 30 (S1012, FIG. 12), receive a response identification code from the user terminal 30 through the tentative reservation confirmation page (S1014), and identify the response (approved/not approved) (S1016). On the other hand, when the response identification code is contained (Yes in S1008), identify the response (approved/not approved) immediately (S1016).

(23) Update the member management information of the tentative reservation DB 15. In this example, set "response flag" and, when the identified response is "approved", set "approval flag" (S1018). Then, update the tentative reservation management information of the tentative reservation DB 15. In this example, subtract 1 from "number of unanswered members" (S1020).

(24) Determine whether the identified response is "approved" or not (S1122). When the response is "approved" (Yes in S1122), update the tentative reservation management information of the tentative reservation DB 15. In this example, add 1 to "number of members decided to participate" (S1124). Then, determine whether the number of members decided to participate is equal to the total maximum number of guests (S1132). Note that the total maximum number of guests is the product of "tentative order quantity" and "maximum number of guests" in the tentative reservation basic information of the tentative reservation DB 15. When the number of members decided to participate is not equal to the total maximum number of guests (No in S1132), or when the identified response is not "approved" (No in S1122), determine whether the number of unanswered members is 0 or not (S1134).

(25) When the number of members decided to participate is equal to the total maximum number of guests (Yes in S1132), or when the number of unanswered members is 0 (Yes in S1134), finalize the order quantity (S1136), assign a new reservation number and register reservation information with the finalized order quantity (S1138). Note that the "order quantity" of the registered reservation information is equal to the "tentative order quantity" of the tentative reservation management information. Then, update the tentative reservation management information of the tentative reservation DB 15. In this example, change the "tentative reservation status" to "end" (S1140).

Figure 13:
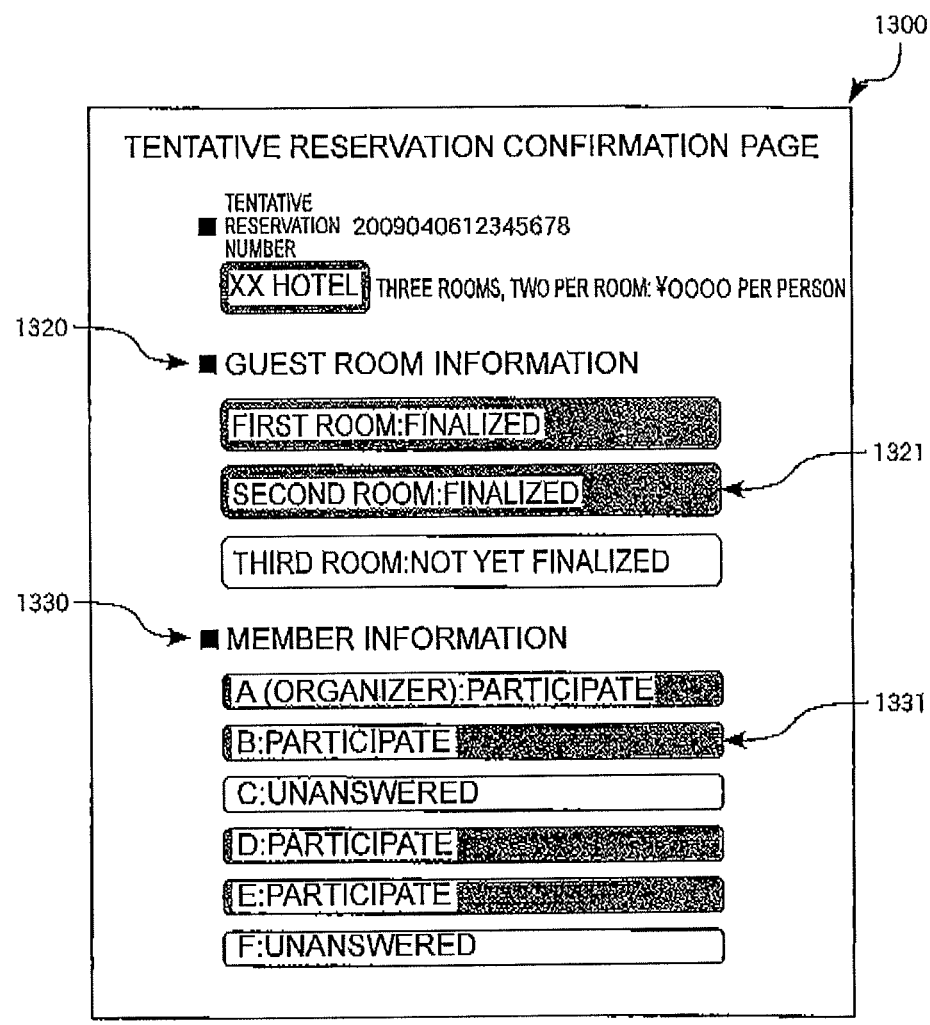
FIG. 13 is a display example of a tentative reservation confirmation page after response (embodiment).

(26) When the number of unanswered members is not 0 (No in S1134) or after update of the tentative reservation status, create a tentative reservation confirmation page (S1142) and send it to the user terminal 30 (S1144, FIG. 13). Further, notify the user terminal 20 that a change has been made to the tentative reservation management information of the tentative reservation DB 15, for example, via email (S1146).

(b) Page Sending Request

FIG. 7(c) shows major items of a page sending request A. As shown in FIG. 7(c), one piece of page sending request A contains "tentative reservation identification data", "member identification data", and "response identification code". FIG. 7(d) shows major items of a page sending request B. As shown in FIG. 7(d), one piece of page sending request B contains "tentative reservation identification data" and "member identification data" but does not contain "response identification code". Note that the page sending requests (A, B) are HTTP requests, and "tentative reservation identification data", "member identification data", and "response identification code" are URL parameters (refer to 933 in FIG. 9).

(c) Tentative Reservation Confirmation Page

Figure 12:
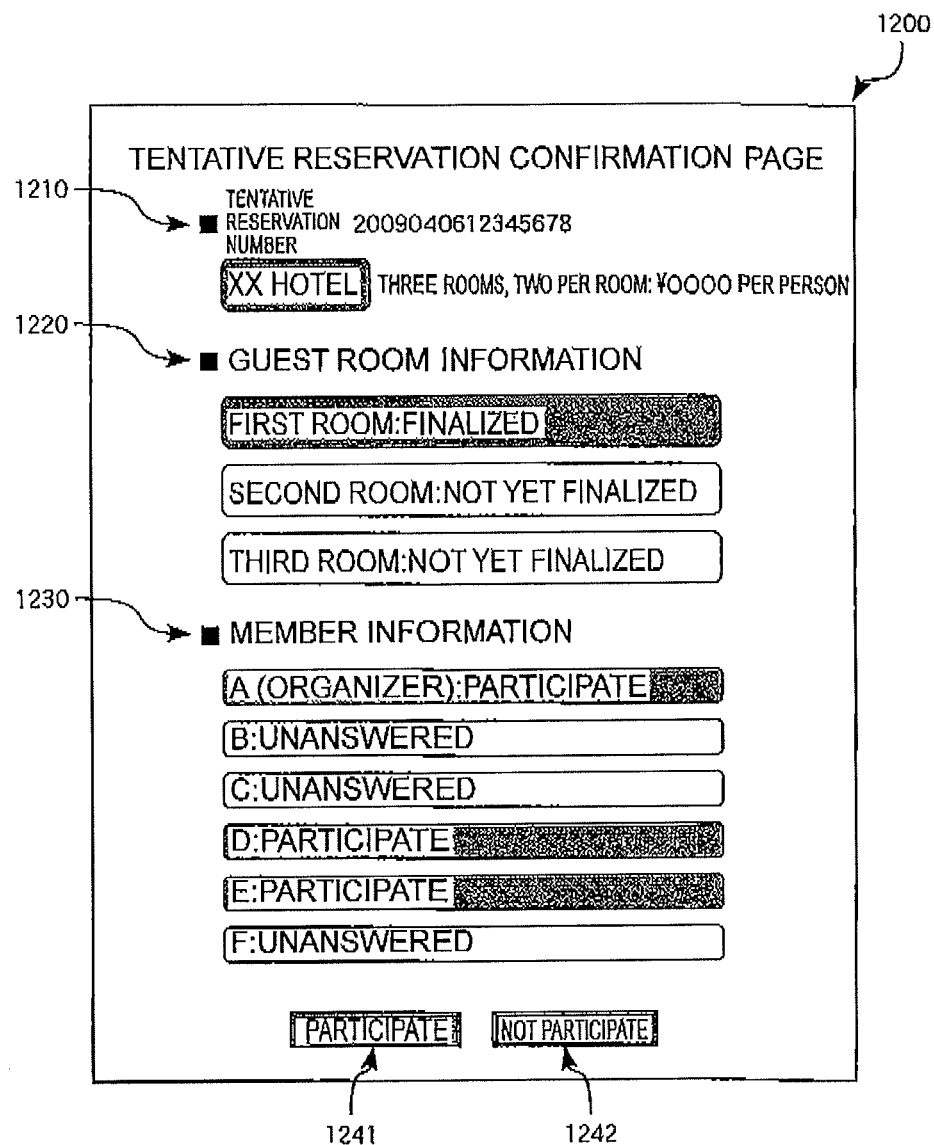
FIG. 12 is a display example of a tentative reservation confirmation page before response (embodiment).

FIG. 12 shows a display example of a tentative reservation confirmation page before response. As shown in FIG. 12, a tentative reservation confirmation page 1200 contains areas 1210, 1220 and 1230. Further, a member can respond to the approval request from the organizer by clicking a button 1241 or 1242 for response. In the area 1210, information related to the tentative reservation is displayed. The displayed information is a link to a detailed page of an accommodation facility (or a guest room) related to the tentative reservation, a price per person and the like, for example.

In the area 1220, information about guest rooms which are tentatively reserved is displayed. In this example, the largest integer equal to or smaller than the quotient obtained by dividing the number of members decided to participate by the maximum number of guests is an expected finalization quantity, and the display pattern of guest rooms corresponding to the expected finalization quantity has changed. In the display example of FIG. 12, the largest integer 1 equal to or smaller than the quotient obtained by dividing the number of members decided to participate 3 (three persons: "A", "D", "E") by the maximum number of guests 2 is the expected finalization quantity, and the display pattern of "first room" has changed. In this manner, by displaying information related to the expected finalization quantity of the accommodation plan on the tentative reservation confirmation page, members can easily determine whether or not to participate.

In the area 1230, information of members is displayed. In this example, names or nicknames of all members and participation/nonparticipation/unanswered are displayed. The participation/nonparticipation/unanswered may be specified by "response flag" and "approval flag" of the member management information. In the display example of FIG. 12, the display pattern of the members decided to participate ("A", "D", "E") has changed. In this manner, by displaying information related to the response status of each member on the tentative reservation confirmation page, members can easily determine whether or not to participate.

FIG. 13 shows a display example of a tentative reservation confirmation page after response. A tentative reservation confirmation page 1300 is a display example just after a member ("B") makes a response (approval) by clicking the URL 933 (which corresponds to "participate") in the approval request email 900 (FIG. 9) or the button 1241 (on which "participate" is displayed) in the tentative reservation confirmation page 1200 (FIG. 12). The structure of the tentative reservation confirmation page 1300 is the same as the tentative reservation confirmation page 1200 (FIG. 12) except that a button for response is not placed.

In the area 1320, information about guest rooms which are tentatively reserved is displayed. In the display example of FIG. 13, the largest integer 2 equal to or smaller than the quotient obtained by dividing the number of members decided to participate 4 (four persons: "A", "B", "D", "E") by the maximum number of guests 2 is the expected finalization quantity, and the display pattern of "second room" has further changed (1321). In the area 1330, information of members is displayed. In the display example of FIG. 13, the display pattern of the member newly decided to participate ("B") has further changed (1331).

3-3. Checking of Response Status

Figure 14:
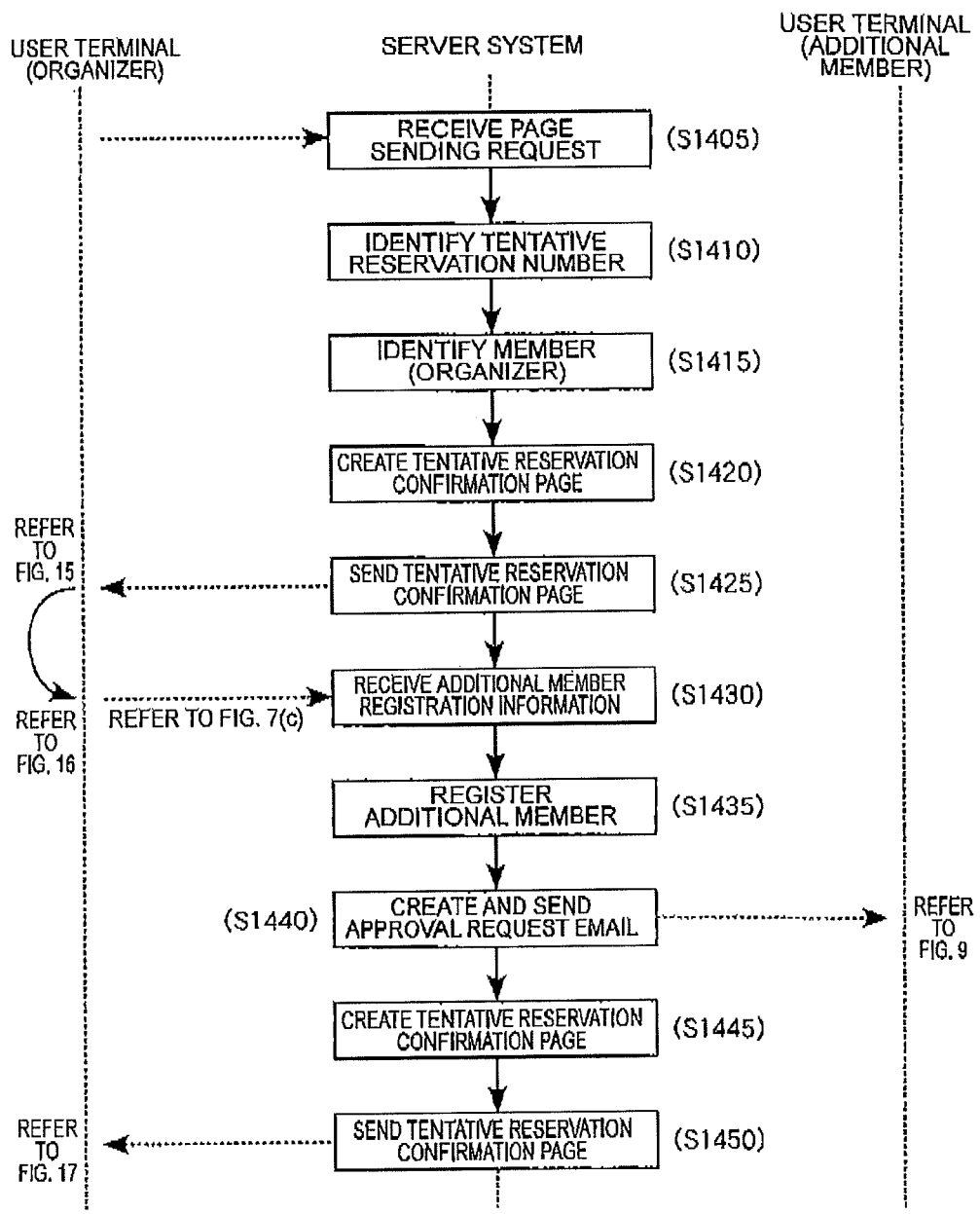
FIG. 14 is a flowchart showing a response status checking process (embodiment).

A response status checking process using the server system 10 is described hereinafter with reference to FIGS. 14 to 17 (particularly, the flowchart of FIG. 14). In FIG. 14, other drawing numbers to be referred to are shown. Refer to such other drawings according to need.

(a) Response Status Checking Process

FIG. 14 shows a response status checking process. Hereinafter, a case where presentation of a response status is followed by registration of an additional member and sending of an approval request email in response to an operation of an organizer is described by way of illustration. This process allows solicitation of an additional member when it turns out that there is deficiency in the number of participating members, for example. As shown in FIG. 14, the server system 10 receives responses by the following steps (31) to (34).

(31) Upon receiving a page sending request from the user terminal 20 (S1405), identify a tentative reservation number (S1410) and identify a user ID of an organizer (S1415). In this example, it is assumed that an organizer is authenticated in advance using a user ID and a password, and a tentative reservation is identified by information designating a tentative reservation (which is a tentative reservation number in this example) that is received together with the page sending request, and a user ID of the organizer is identified by information specifying a member (which is a cookie session ID in this example). Note that a URL that contains information for identifying a tentative reservation and an organizer as a parameter may be included in a notification about a change in tentative reservation information (email sent in S1146 of FIG. 11), and a page sending request designating the URL containing the parameter may be received from the user terminal 20.

Figure 15:
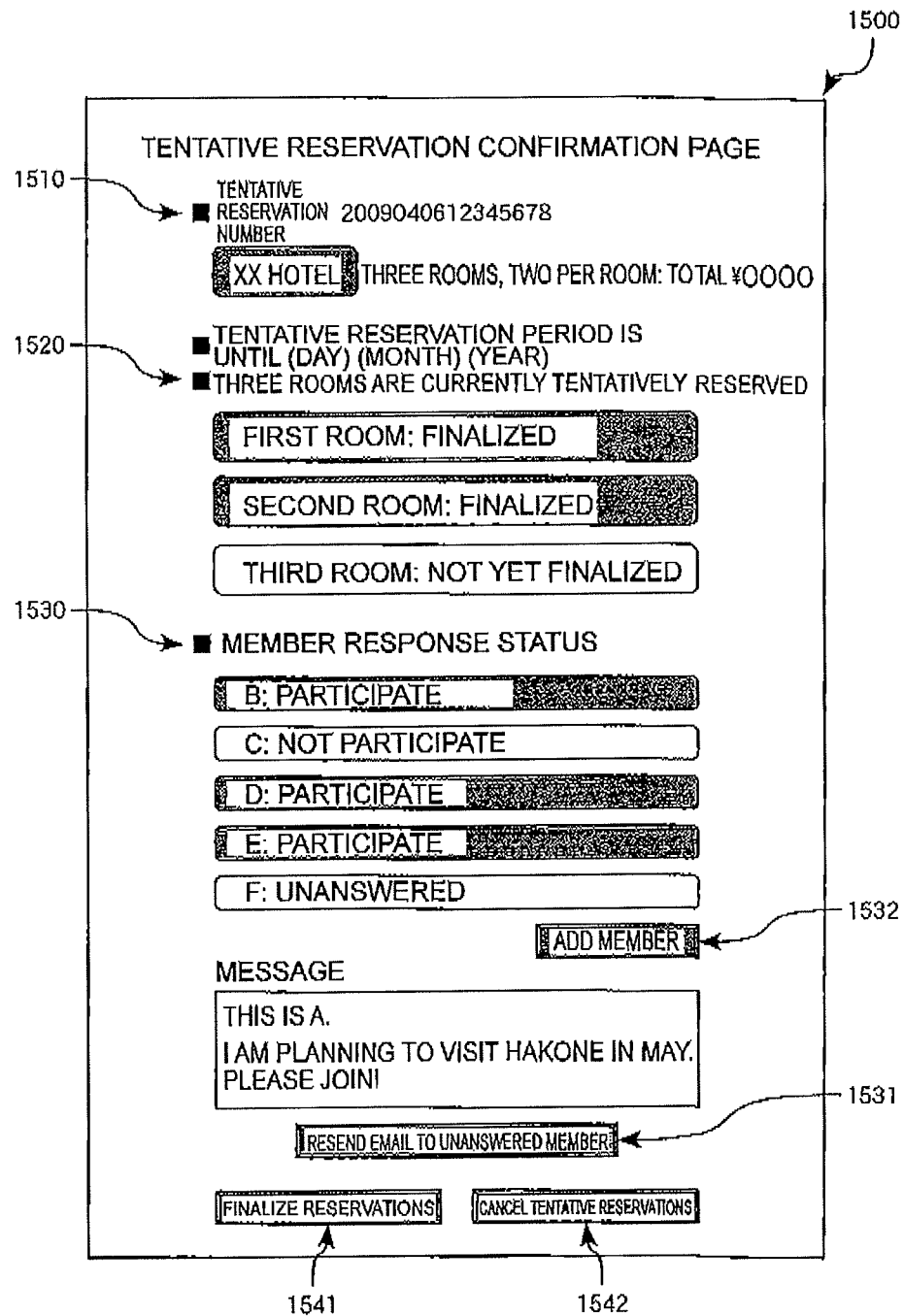
FIG. 15 is a display example of a tentative reservation confirmation page before additional member registration (embodiment).

(32) Create a tentative reservation confirmation page related to the identified tentative reservation number (S1420) and send it to the user terminal 20 (S1425, FIG. 15).

(33) Upon receiving additional member registration information from the user terminal 20 through the tentative reservation confirmation page (FIG. 16) (S1430), register additional member information into the tentative reservation DB 15 (S1435), create an approval request email and send it to an email address of the added member (S1440, FIG. 9).

(34) Create a tentative reservation confirmation page (S1445) and send it to the user terminal 20 (S1450, FIG. 17).

(b) Tentative Reservation Confirmation Page

FIG. 15 shows a display example of a tentative reservation confirmation page before additional member registration. As shown in FIG. 15, a tentative reservation confirmation page 1500 contains areas 1510, 1520 and 1530. Further, an organizer can discontinue the receipt of responses and immediately finalize a reservation or cancel the tentative reservation by clicking a button 1541 or 1542. In the area 1510, information related to the tentative reservation is displayed. The displayed information is a link to a detailed page of an accommodation facility (or a guest room) related to the tentative reservation, a total price, a tentative reservation period and the like, for example.

In the area 1520, information about guest rooms which are tentatively reserved is displayed. In this example, the largest integer equal to or smaller than the quotient obtained by dividing the number of members decided to participate by the maximum number of guests is an expected finalization quantity, and the display pattern of guest rooms corresponding to the expected finalization quantity has changed (which is the same as the area 1220 of the tentative reservation confirmation page 1200 (FIG. 12)). In this manner, by displaying information related to the expected finalization quantity of the accommodation plan on the tentative reservation confirmation page, an organizer can easily grasp the progress of the tentative reservation.

In the area 1530, information of members is displayed. In this example, nicknames of all members except an organizer and participation/nonparticipation/unanswered is displayed. The participation/nonparticipation/unanswered may be specified by "response flag" and "approval flag" of the member management information. In this manner, by displaying information related to the response status of each member on the tentative reservation confirmation page, an organizer can easily grasp the response status of each member. Further, in the area 1531, by entering a message into the message field and clicking a button 1530, it is possible to resend the approval request email to unanswered members and give a reminder that the response due date is approaching, for example.

In the area 1530, it is possible to add a member and send an approval request email. A process of sending an approval request email to an additional member is as follows.

(1) Click a button 1532 and add an input field of a nickname and an email address and an email send button to an additional member (FIG. 16). Note that such processing is controlled by a script (JavaScript (trademark or registered trademark) etc.) embedded into the tentative reservation confirmation page 1500.

(2) Enter a nickname and an email address of an additional member to the added input field 1533.

(3) Modify or enter a message appearing in the approval request email according to need. Note that a message included in the approval request email 900 (FIG. 9) sent to the original members appears by default in the message input field.

(4) Click a button 1534 and request registration of additional member information and sending of the approval request email.

Further, grouping (room assignment) for members who have decided to participate to the finalized (or expected to be finalized) rooms can be done if an organizer operates the terminal in a tentative reservation confirmation page (for example, the tentative reservation confirmation page 1500 (FIG. 15)). In the display example of FIG. 15, it is preferred to determine the assignment of the finalized (or expected to be finalized) rooms ("first room", "second room") to the members who have decided to participate ("A" (organizer), "B", "D" and "E"). Specifically, it is preferred to assign the "first room" to the members "A" (organizer) and "D" and assign the "second room" to the members "E" and "B".

(c) Additional Member Registration Information

FIG. 7(*e*) shows major items of additional member registration information. As shown in FIG. 7(*e*), one piece of additional member registration information includes "tentative reservation number", "message", and "nickname" and "email address" of additional members (1, 2, . . . ). Note that, in the case of specifying a tentative reservation number using information for specifying a tentative reservation number (for example, a cookie session ID etc.), the above "tentative reservation number" may be excluded.

(d) Tentative Reservation Confirmation Page

FIG. 17 shows a display example of a tentative reservation confirmation page after additional member registration. The tentative reservation confirmation page 1700 is the state just after a member ("G") is added. The structure of the tentative reservation confirmation page 1700 is the same as the tentative reservation confirmation page 1500 (FIG. 15). In the display example of FIG. 17, the new member ("G") is added as an "unanswered" member in the area 1730 (1735).

3-4. Batch Processing

A process of batch processing by the server system 10 is described hereinafter with reference to FIGS. 18 and 19 (particularly, the flowchart of FIG. 18). In FIG. 18, other drawing numbers to be referred to are shown. Refer to such other drawings according to need.

Hereinafter, a three-step process is described by way of illustration. In this embodiment, the following steps (a), (b) and (c) are executed in this order by nightly batch processing.

(a) Discontinuance of response receipt: discontinue the receipt of responses for a tentative reservation for which the response due date has passed.

(b) Registration of reservation information: finalize the order quantity related to a tentative reservation for which the order quantity is indeterminate and register reservation information.

(c) Notification of placement of reservation: notify members including a facility and an organizer that a reservation is in place.

It should be noted that the interval of activating the batch processing may be set shorter for the above processing (c) only. This allows earlier notification of placement of a reservation when the response receipt is made to discontinue for a reason other than the passing of the response due date (for example, when the response receipt is made to discontinue by the processing of S1140 in FIG. 11).

(a) Discontinuance of Response Receipt

FIG. 18(*a*) shows a process of discontinuing the receipt of responses. As shown in FIG. 18(*a*), the server system 10 discontinues the receipt of responses by the following steps (41) to (42).

(41) Extract a tentative reservation number that satisfies predetermined extraction conditions (S1805*a*). In this example, a tentative reservation number of a tentative reservation whose tentative reservation status is "under request" (condition A1) and response due date has already passed (condition A2) is extracted as shown in FIG. 19(*a*).

(42) Update the tentative reservation status to "under confirmation" (S1810*a*).

(b) Registration of Reservation Information

FIG. 18(*b*) shows a process of registering reservation information. As shown in FIG. 18(*b*), the server system 10 registers reservation information by the following steps (51) to (54).

(51) Extract a tentative reservation number that satisfies predetermined extraction conditions (S1805*a*). In this example, a tentative reservation number of a tentative reservation whose tentative reservation status is "under confirmation" (condition B) is extracted as shown in FIG. 19(*b*).

(52) Finalize the order quantity (S1810*b*), assign a new reservation number and register reservation information with the finalized order quantity into the reservation DB 14 (S1820*b*). In this example, the minimum natural number equal to or larger than the quotient obtained by dividing the number of members decided to participate by the maximum number of guests is "order quantity" of reservation information as shown in FIG. 19(*c*).

(53) Cancel tentative reservations for which reservations are not made (S1825*b*). In this example, the difference obtained by subtracting "order quantity" finalized in the above (52) from "tentative order quantity" of the tentative reservation basic information is "cancellation quantity" of tentative reservations as shown in FIG. 19(*d*).

(54) Update the tentative reservation status to "end" (S1830*b*).

(c) Notification of Placement of Reservation

FIG. 18(*c*) shows a process of notifying placement of a reservation. As shown in FIG. 18(*c*), the server system 10 notifies placement of a reservation by the following steps (61) to (63).

(61) Extract a tentative reservation number that satisfies predetermined extraction conditions (S1805c). In this example, a tentative reservation number of a tentative reservation whose tentative reservation status is "end" (condition C) is extracted as shown in FIG. 19(e).

(62) Notify placement of a reservation via email (S1810c). In this example, notification is given to an organizer, members other than the organizer and an accommodation facility related to the tentative reservation. Destination email addresses are extracted from the user information (FIG. 4(a)) of the user DB 11, the member basic information (FIG. 5(e-3)) of the tentative reservation DB 15, and the facility basic information (FIG. 4(b-1)) of the facility DB 12, respectively.

(63) Update the tentative reservation status to "closed" (S1815c).

4. Alternative Example

(a) Handling of Member Information

In the above-described embodiment, member registration information is received from the user terminal 20, and member information is registered into the tentative reservation DB 15 (S630, S635 of FIG. 6). On the other hand, member information may be registered only when approval for registration of information (or sending of email) is obtained from each member. When approval is not obtained from a member, email related to tentative reservations or reservations is not sent.

Further, member information may be not registered at all. In the case of not registering member information, the above-described embodiment may be altered as follows.

- Only the URL corresponding to approval (participation in stay) is included in the approval request email (FIG. 9). Only tentative reservation identification data and identification data for excluding multiple responses are included in the parameter of the URL.
- When a request for sending a tentative reservation confirmation page is received, identify a tentative reservation number and add 1 to "number of members decided to participate" (FIG. 5(e-2)) corresponding to the identified tentative reservation number. In this example, all responses are assumed to be "approved". Note that when it is determined as a response for the second or later time from the same member as a result of identifying the identification data for excluding multiple responses, "number of members decided to participate" is not updated.
- When "number of members decided to participate" is equal to the total maximum number of guests, the same processing as the finalization of the order quantity (S1136 of FIG. 11) and the subsequent processing is executed.
- Answer (participation/nonparticipation/unanswered) in a response of each member is not stored. In the tentative reservation confirmation page (FIG. 12, 15 etc.), the number of members decided to participate or the like is displayed as information of members.

On the other hand, when there is an email address that has been registered at the time of another reservation or tentative reservation, the email address may be selected by an organizer. In this case, the organizer can skip entering an email address. The server system 10 specifies email addresses of members by the following process, for example. Note that it is assumed that information (including email addresses) of companions (members) is registered for each user ID.

(1) Display a list of registered companions (members) on a given page.

(2) Receive information designating one or a plurality of members in the list from the user terminal 20.

(3) Specify email addresses of members using the received information.

(b) Receipt of Response

"Tentative reservation identification data", "member identification data" and "response identification code" may be received via email. For example, a given email address is set as a return address (Reply-To) of the approval request email, and "tentative reservation identification data", "member identification data", "response identification code" and the like are received by a reply mail to the approval request email. The server system 10 extracts "tentative reservation identification data", "member identification data" and "response identification code" from the received reply mail and identifies a tentative reservation number, member and response. Note that, in the above-described case, a member may be identified by a sender email address of the reply mail, rather than "member identification data".

(c) Reminder of Response Due Date

For reminder, an email may be sent to an organizer several days prior to the response due date. This allows the organizer an opportunity to resend the approval request email to unanswered members by operating the user terminal 20. Note that a request for resending the approval request email is made from the area 1530 of FIG. 15. Further, for reminder, an email may be sent to unanswered members several days prior to the response due date.

(d) Application of Affiliate Program

An affiliate can be defined as a "service that pays a reward to a user who has promoted a product that is offered in an online shopping site through the user's private blog, website or the like when another user purchases the product due to the promotion", for example. In this definition, by substituting "product" by "accommodation service" and "promotion through a blog, website or the like" by "invitation through email", the above-described affiliate service can be applied as it is to the process of the accommodation reservation procedure implemented by the system according to the embodiment. Specifically, a parameter for identifying an organizer, which is a person who makes introduction (invitation), may be added to a URL for response (the URL 933 of the approval request email 900 (FIG. 9)).

Other Embodiments

In the above-described embodiment, the order quantity of accommodation plans for which transition from tentative reservations to reservations is made is finalized at the point of time when specific conditions are satisfied, and reservation information is registered all at once (S1136 and S1138 of FIG. 11, 1810b and S1820b of 18(b)). On the other hand, transition from tentative reservations for some accommodation plans to reservations may be made each time specific conditions are satisfied so that reservation information is registered in real time.

(a) Response Receiving Process

Figure 20:
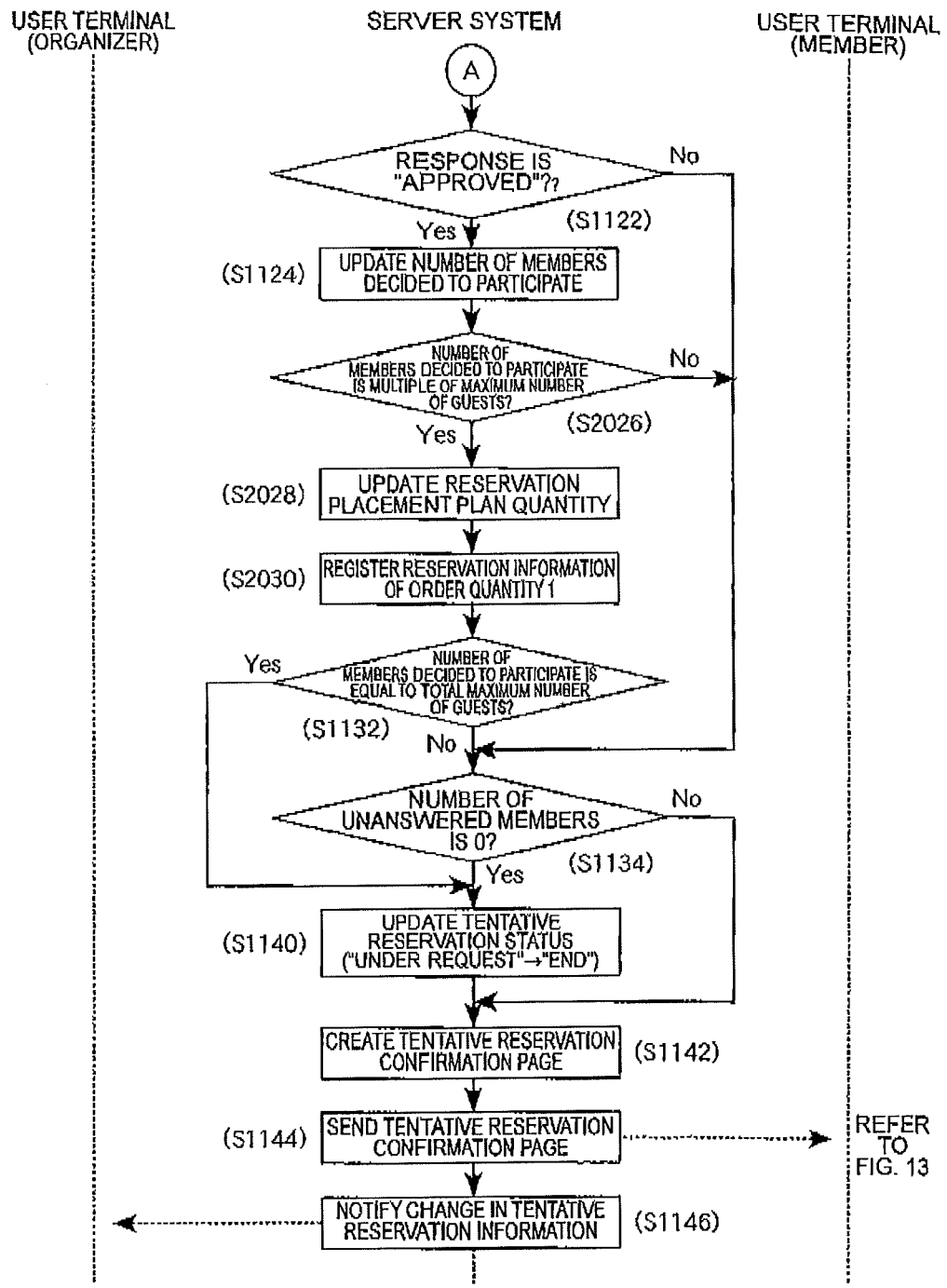
FIG. 20 is a flowchart showing a response receiving process (another embodiment).

FIG. 20 shows an alternative example of a response receiving process. Hereinafter, a case where update of tentative reservation information by the process shown in FIG. 10 is followed by condition determination based on answers in responses and the number of responses by the process shown in FIG. 20 and then registration of reservation information is described by way of illustration. This process allows a reservation of a certain accommodation plan to be made at earlier times during the tentative reservation period even when the response due date has not yet passed. Because whether a reservation is made or not is determined at an early date, it is considered to be particularly convenient for accommodation facilities. As shown in FIG. 20, the server system 10 receives responses by the following steps (71) to (75) subsequent to the above-described steps (21) to (23) (S1002 to S1020 of FIG. 10). Note that, in FIG. 20, processing denoted by the same reference symbol as in FIG. 11 is the same processing.

(71) Determine whether the identified response is "approved" or not (S1122). When the response is "approved" (Yes in S1122), update the tentative reservation management information of the tentative reservation DB 15. In this example, add 1 to "number of members decided to participate" (S1124).

(72) Determine whether the number of members decided to participate is the multiple of the maximum number of guests (S2026). When it is the multiple of the maximum number of guests (Yes in S2026), update the tentative reservation management information of the tentative reservation DB 15. In this example, add 1 to "reservation placement plan quantity" (S2028). Then, assign a new reservation number and register reservation information of the order quantity 1 into the reservation DB 14 (S2030).

(73) Determine whether the number of members decided to participate is equal to the total of the maximum number of guests (S1132). Note that the total of the maximum number of guests is the product of "tentative order quantity" and "maximum number of guests" in the tentative reservation basic information of the tentative reservation DB 15. When the number of members decided to participate is not equal to the total maximum number of guests (No in S1132), when the identified response is not "approved" (No in S1122), or when the number of members decided to participate is not the multiple of the maximum number of guests (No in S2026), determine whether the number of unanswered members is 0 or not (S1134).

(74) When the number of members decided to participate is equal to the total maximum number of guests (Yes in S1132), or when the number of unanswered members is 0 (Yes in S1134), update the tentative reservation management information of the tentative reservation DB 15. In this example, change "tentative reservation status" to "end" (S1140).

(75) When the number of unanswered members is not 0 (No in S1134) or after update of the tentative reservation status, create a tentative reservation confirmation page (S1142) and send it to the user terminals 30 (S1144, FIG. 13). Further, notify the user terminal 20 that a change has been made to the tentative reservation management information of the tentative reservation DB 15, for example, via email (S1146). Note that, although display of the tentative reservation confirmation page is the same as that of the tentative reservation confirmation page 1300 (FIG. 13), "expected finalization quantity" in an area displaying information of guest rooms (which is the area 1320 in FIG. 13) is replaced by "reservation placement plan quantity" (namely, finalization quantity).

(b) Batch Processing

Figure 21:
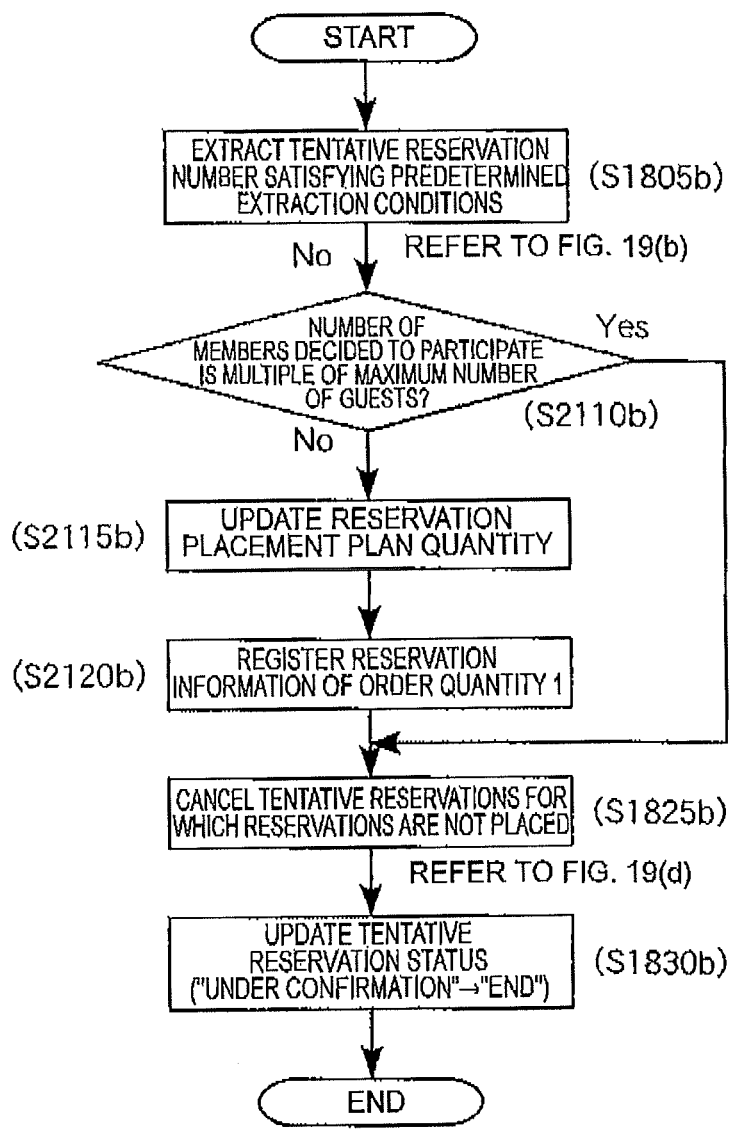
FIG. 21 is a flowchart showing a batch process (another embodiment).

FIG. 21 shows an alternative example of batch processing. The batch processing shown in FIG. 21 is an alternative example of the batch processing shown in FIG. 18(b). Thus, the batch processing shown in FIG. 21 is executed in succession to the batch processing shown in FIG. 18(a), and the batch processing shown in FIG. 18(c) is executed in succession to the batch processing shown in FIG. 21. As shown in FIG. 21, the server system 10 receives responses by the following steps (81) to (84). Note that, in FIG. 21, processing denoted by the same reference symbol as in FIG. 18(b) is the same processing.

(81) Extract a tentative reservation number that satisfies predetermined extraction conditions (S1805a). In this example, a tentative reservation number of a tentative reservation whose tentative reservation status is "under confirmation" (condition B) is extracted as shown in FIG. 19(b).

(82) Determine whether the number of members decided to participate is the multiple of the maximum number of guests (S2110b). When it is not the multiple of the maximum number of guests (No in S2110b), update the tentative reservation management information of the tentative reservation DB 15. In this example, add 1 to "reservation placement plan quantity" (S2115b). Then, assign a new reservation number and register reservation information of the order quantity 1 into the reservation DB 14 (S2120b).

(83) When the number of members decided to participate is the multiple of the maximum number of guests (Yes in S2110b) or after registration of reservation information, cancel tentative reservations for which reservations are not made (S1825b). In this example, the difference obtained by subtracting "reservation placement plan quantity" (="order quantity") of the tentative reservation management information from "tentative order quantity" of the tentative reservation basic information is "cancellation quantity" of tentative reservations as shown in FIG. 19(d).

(84) Update the tentative reservation status to "end" (S1830b).

(c) Matching of Relevant Reservation Information

In the above-described embodiment, the order quantity of accommodation plans for which transition from tentative reservations to reservations is made is finalized at the point of time when specific conditions are satisfied, and reservation information is registered all at once (S1136 and S1138 of FIG. 11). Therefore, there is only one reservation information related to a reservation which has transitioned from one tentative reservation. On the other hand, in the case of making tentative reservations for some accommodation plans transition to reservations each time specific conditions are satisfied and sequentially registering reservation information, there is a possibility that there are a plurality of reservation information related to reservations which have transitioned from one tentative reservation.

Thus, it is preferred to associate reservation information related to reservations which have transitioned from the same tentative reservation with one another and handle it as group bookings. For example, the following steps may be taken.

Associate reservation information related to reservations which have transitioned from the same tentative reservation with one another in the reservation DB 14. For example, "tentative reservation number" is set as a mandatory item in reservation information (see FIG. 5(d)).

When "reservation placement plan quantity" (tentative reservation management information of the tentative reservation DB 15) is plural, an indication that it should be handled as group bookings is included in an email notifying that a reservation is made (particularly, email sent to an email address of an accommodation facility) or the like to call attention. At this time, it is preferred to read all reservation numbers having the same tentative reservation number in the reservation DB 14 and notify them as a list to the accommodation facility.

Supplementary Explanation

The system according to the embodiment and the system according to another embodiment internally execute various kinds of processing to make "stock quantity" of accommodation plans consistent with "vacant room quantity" of guest rooms. Note that, it is assumed that the relationship between "stock quantity" of accommodation plans and "vacant room quantity" of guest rooms is as follows.

Each facility sets the offered quantity of room types for each date of stay. The offered quantity corresponds to the default value of "vacant room quantity" of the vacancy management information (FIG. 4(b-4)).

Each facility allocates guest rooms of a specific room type for accommodation plans for each date of stay, up to "vacant room quantity" as the upper limit. The number of allocated rooms is "allocated quantity" of the guest room allocation information (FIG. 4(b-3)). Note that guest rooms may be allocated for a plurality of accommodation plans in an overlapping manner as long as not exceeding the above "vacant room quantity".

A process of the internal processing is generally as follows.

(a) At Registration of Tentative Reservation Information (1) Subtract "tentative order quantity" from "stock quantity" (FIG. 4(c-2)) corresponding to "accommodation plan ID" related to a tentative reservation application.

(2) Track information: "stock quantity" reduced in the above (1)→"accommodation plan ID" (FIG. 4(c-2)), "accommodation plan ID"→"facility ID", "date of stay", "room type" (FIG. 4(c-1)), "facility ID", "date of stay", "room type"→"vacant room quantity" (FIG. 4(b-4)), and subtract "tentative order quantity" from "vacant room quantity" (FIG. 4(b-4)). At the same time, add "tentative order quantity" to "tentatively reserved room quantity" (FIG. 4(b-4)).

(3) Track information: "vacant room quantity" reduced in the above (2)→"facility ID", "date of stay", "room type" (FIG. 4(b-4)), "facility ID", "date of stay", "room type"→"accommodation plan ID" (FIG. 4(b-3)), "accommodation plan ID"→"stock quantity" (FIG. 4(c-2)), and subtract the value exceeding the "vacant room quantity" reduced in the above (2) from "stock quantity" corresponding to "accommodation plan ID" for which tentative reservation application is not made.

(b) At Registration of Reservation Information (1) Track information: "tentative reservation number" related to tentative reservation information having transitioned to reservation information→"accommodation plan ID" (FIG. 5(d)), "accommodation plan ID"→"facility ID", "date of stay", "room type" (FIG. 4(c-1)), "facility ID", "date of stay", "room type"→"tentatively reserved room quantity" (FIG. 4(b-4)), and subtract "order quantity" from "tentatively reserved room quantity" (FIG. 4(b-4)).

(2) Add "order quantity" to "reserved room quantity" (FIG. 4(b-4)).

(c) At Cancellation of Tentative Reservation (1) Add "cancellation quantity" to "stock quantity" (FIG. 4(c-2)) corresponding to "accommodation plan ID" related to partial cancellation.

(2) Track information: "stock quantity" increased in the above (1)→"accommodation plan ID" (FIG. 4(c-2)), "accommodation plan ID"→"facility ID", "date of stay", "room type" (FIG. 4(c-1)), "facility ID", "date of stay", "room type"→"vacant room quantity" (FIG. 4(b-4)), and add "cancellation quantity" to "vacant room quantity" (FIG. 4(b-4)). At the same time, subtract "cancellation quantity" from "tentatively reserved room quantity" (FIG. 4(b-4))

(3) Track information: "vacant room quantity" increased in the above (2)→"facility ID", "date of stay", "room type" (FIG. 4(b-4)), "facility ID", "date of stay", "room type"→"accommodation plan ID" (FIG. 4(b-3)), "accommodation plan ID"→"stock quantity" (FIG. 4(c-2)), and add "cancellation quantity" to "stock quantity" corresponding to "accommodation plan ID" for which cancellation is not made, up to "allocated quantity" (FIG. 4(b-3)) as the upper limit.

As described above, the server system according to the present invention receives a tentative reservation application from an organizer, requests approval from members, and receives responses to the request for approval from the members. Then, the server system makes a reservation of an order quantity of 1 each time the number of participants in stay reaches the multiple of the maximum number of guests for the accommodation plan related to the tentative reservation. Thus, with use of the server system according to the present invention, an organizer who represents a group and carries out an accommodation reservation procedure can solicit participating members and hold an accommodation at the same time. On the other hand, participants can definitely participate if giving approval.

Further, the server system according to the present invention receives a tentative reservation application from an organizer, requests approval from members, and receives responses to the request for approval from the members. Then, the server system finalizes the order quantity of an accommodation plan when predetermined conditions are satisfied, such as when a certain period of time has elapsed, makes reservations of the finalized order quantity and cancels tentative reservations which have not transitioned to reservations.

REFERENCE SIGNS LIST

10 . . . Server system, 11 . . . User DB, 12 . . . Facility DB, 13 . . . Accommodation plan DB, 14 . . . Reservation DB, 15 . . . Tentative reservation DB, 20 . . . User terminal (organizer), 30 . . . User terminal (member), 40 . . . Facility terminal, 50 . . . Internet, 800 . . . Tentative reservation confirmation page, 900 . . . Approval request email, 1200 . . . Tentative reservation confirmation page, 1300 . . . Tentative reservation confirmation page, 1500 . . . Tentative reservation confirmation page, 1700 . . . Tentative reservation confirmation page

The invention claimed is:

1. A server system of a group reservation support system where a terminal of each member forming a group of a plurality of members and the server system supporting an accommodation plan reservation procedure carried out by an organizer representing the group via a Web page are connected through a communication network; capable of accessing:

a reservation information storage unit capable of storing, in association with a reservation number, identification information of an organizer, identification information of an accommodation plan, and an order quantity of the accommodation plan; and a tentative reservation information storage unit capable of storing, in association with a tentative reservation number, identification information of an organizer, identification information of an accommodation plan, a tentative order quantity of the accommodation plan, and number of members decided to participate; and the server system comprises:

a tentative reservation application information receiving unit configured to receive the identification information of an organizer, the identification information of an accommodation plan, and the tentative order quantity of the accommodation plan from a terminal of the organizer;

a tentative reservation information registration unit configured to write the received information items in association with a tentative reservation number into the tentative reservation information storage unit;

an approval request email creation and sending unit configured to create an approval request email at least containing a tentative reservation identification data, corresponding to the tentative reservation number and sending the approval request email to the terminals that are used by members other than the organizer;

a response receiving unit configured to receive a response data containing the tentative reservation identification data from the terminal of a member other than the organizer;

a first reservation placement determination unit configured to obtain a number of members decided to participate corresponding to the tentative reservation number, identified by the tentative reservation identification data, and updated based on the response data and configured to determine that a reservation of an order quantity of one is to be placed each time the updated number of members decided to participate reaches a multiple of a maximum number of guests allowed for a room type of an accommodation plan; and a reservation information partial registration unit configured to, in response to the determination of the first reservation placement determination unit, write identification information of an organizer and identification information of an accommodation plan corresponding to a tentative reservation number related to a tentative reservation determined that a reservation is to be placed and the order quantity of one in association with a new reservation number into the reservation information storage unit.

2. The server system according to claim 1, further comprising:

a second reservation placement determination unit configured to read number of members decided to participate corresponding to a specified tentative reservation number from the tentative reservation information storage unit when predetermined conditions are satisfied, and determining that a reservation of an order quantity of one is to be placed when the number of members decided to participate is not a multiple of the maximum number of guests allowed for the room type of the accommodation plan.

3. The server system according to claim 2, wherein the tentative reservation information storage unit is capable of further storing a reservation placement plan quantity, and the server system further comprises:

a reservation placement quantity counting unit configured to add one to a reservation placement plan quantity corresponding to the tentative reservation number related to the tentative reservation, determined that a reservation is to be placed, stored in the tentative reservation information storage unit; and a partial reservation cancellation unit configured to further read identification information of an accommodation plan, a tentative order quantity and a reservation placement plan quantity corresponding to the specified tentative reservation number from the tentative reservation information storage unit when the predetermined conditions are satisfied, and adding a difference between the tentative order quantity and the reservation placement plan quantity to a stock quantity corresponding to the identification information of the accommodation plan stored in the tentative reservation information storage unit.

4. The server system according to claim 2, wherein the tentative reservation information storage unit is capable of further storing a response due date in association with the tentative reservation number, the tentative reservation application information receiving unit further receives a response due date, the tentative reservation information registration unit further writes the received response due date in association with the tentative reservation number into the tentative reservation information storage unit, and when a response due date corresponding to any of tentative reservation numbers stored in the tentative reservation information storage unit has passed, the second reservation placement determination unit specifies the tentative reservation number for which the response due date has passed and determines whether or not to place a reservation corresponding to the specified tentative reservation number.

5. The server system according to claim 1, wherein the server system is further capable of accessing an accommodation plan information storage unit configured to store, in association with identification information of an accommodation plan, a maximum number of guests allowed for the room type of the accommodation plan and a stock quantity of the accommodation plan; and the tentative reservation information registration unit reads a stock quantity corresponding to the received identification information of the accommodation plan from the accommodation plan information storage unit and, when the stock quantity is equal to or more than the received tentative order quantity, subtracts the tentative order quantity from the stock quantity stored in the accommodation plan information storage unit and writes the received information items in association with a tentative reservation number into the tentative reservation information storage unit.

6. The server system according to claim 1, wherein the response receiving unit further reads a tentative order quantity corresponding to the identified tentative reservation number from the tentative reservation information storage unit and, when the updated number of members decided to participate is equal to a product of the maximum number of guests allowed for the room type of the accommodation plan and the tentative order quantity, discontinues receipt of responses for a tentative reservation related to the tentative reservation number.

7. The server system according to claim 1, wherein
the reservation information storage unit is capable of storing each reservation number in association with a corresponding tentative reservation number, and
the reservation information partial registration unit registers the tentative reservation number related to the tentative reservation determined that a reservation is to be placed and the new reservation number in association with each other into the reservation information storage unit.

8. A server system of a group reservation support system where a terminal of each member forming a group of a plurality of members and the server system supporting an accommodation plan reservation procedure carried out by an organizer representing the group via a Web page are connected through a communication network; capable of accessing:
a reservation information storage unit capable of storing, in association with a reservation number, identification information of an organizer, identification information of an accommodation plan, and an order quantity of the accommodation plan; and
a tentative reservation information storage unit capable of storing, in association with a tentative reservation number, identification information of an organizer, identification information of an accommodation plan, a tentative order quantity of the accommodation plan, and number of members decided to participate; and
the server system comprises:
a tentative reservation application information receiving unit configured to receive the identification information of an organizer, the identification information of an accommodation plan, and the tentative order quantity of the accommodation plan from a terminal of the organizer;
a tentative reservation information registration unit configured to write the received information items in association with a tentative reservation number into the tentative reservation information storage unit;
an approval request email creation and sending unit configured to create an approval request email at least containing a tentative reservation identification data corresponding to the tentative reservation number and sending the approval request email to the terminals that are used by members other than the organizer;
a response receiving unit configured to receive a response data containing the tentative reservation identification data from the terminal of a member other than the organizer;
a first order quantity finalization unit configured to obtain a number of members decided to participate corresponding to the tentative reservation number, identified by the tentative reservation identification data, and updated based on the response data and configured to calculate a minimum integer not less than a value obtained by dividing the number of members decided to participate by a maximum number of guests allowed for a room type of the accommodation plan, and finalizing an order quantity, corresponding to the tentative reservation number, to the calculated minimum integer; and
a reservation information registration unit configured to write identification information of an organizer and identification information of an accommodation plan corresponding to the tentative reservation number of which the order quantity is finalized and the finalized order quantity in association with a reservation number into the reservation information storage unit.

9. The server system according to claim 8, wherein
the server system is further capable of accessing an accommodation plan information storage unit configured to store, in association with identification information of an accommodation plan, the maximum number of guests allowed for the room type of the accommodation plan and a stock quantity of the accommodation plan; and
the tentative reservation information registration unit reads a stock quantity corresponding to the received identification information of the accommodation plan from the accommodation plan information storage unit and, when the stock quantity is equal to or more than the received tentative order quantity, subtracts the tentative order quantity from the stock quantity stored in the accommodation plan information storage unit and writes the received information items in association with a tentative reservation number into the tentative reservation information storage unit.

10. The server system according to claim 9, further comprising:
a partial tentative reservation cancellation unit configured to read identification information of an accommodation plan and a tentative order quantity, corresponding to the tentative reservation number of which the order quantity is finalized, from the tentative reservation information storage unit, and adding a difference between the tentative order quantity and the finalized order quantity to a stock quantity corresponding to the identification information of the accommodation plan stored in the accommodation, plan information storage unit.

11. The server system according to claim 9, wherein
the server system is further capable of accessing a facility information storage unit configured to store, in association with identification information of a facility, a date of stay and a guest room type, a vacant room quantity of the room type,
the accommodation plan information storage unit further stores identification information of a facility, a date of stay and a guest room type in association with the identification information of an accommodation plan, and
the server system further comprises a vacant room quantity update unit configured, upon occurrence of a change in any stock quantity stored in the tentative reservation information storage unit due to certain update processing, to read a set of identification information of a facility, a date of stay and a guest room type corresponding to the changed stock quantity from the accommodation plan information storage unit and performing same update processing as the update processing on a vacant room quantity corresponding to the set stored in the facility information storage unit.

12. The server system according to any one of claim 8, further comprising:
a second order quantity finalization unit configured to read a tentative order quantity corresponding to the identified tentative reservation number from the tentative reservation information storage unit and, when the updated number of members decided to participate is equal to a product of the maximum number of guests allowed for the room type of the accommodation plan and the tentative order quantity, finalizing an order quantity, corresponding to the identified tentative reservation number, to the tentative order quantity.

13. The server system according to claim 8, wherein
the tentative reservation information storage unit is capable of further storing a response due date in association with the tentative reservation number,
the tentative reservation application information receiving unit further receives a response due date,
the tentative reservation information registration unit further writes the received response due date in association with the tentative reservation number into the tentative reservation information storage unit, and
when a response due date corresponding to any of tentative reservation numbers stored in the tentative reservation information storage unit has passed, the first order quantity finalization unit specifies the tentative reservation number for which the response due date has passed and finalizes an order quantity corresponding to the identified tentative reservation number.

14. The server system according to claim 8, further comprising:
a tentative reservation confirmation page creation unit configured, upon receiving a page sending request designating a tentative reservation number from a terminal of any member, to read number of members decided to participate corresponding to the designated tentative reservation number from the tentative reservation information storage unit, calculating a maximum integer not greater than a value obtained by dividing the number of members decided to participate by the maximum number of guests allowed for the room type of the accommodation plan, and creating a tentative reservation confirmation page containing an item related to an expected finalization quantity of reservations using the integer; and
a tentative reservation confirmation page sending unit configured to send the created tentative reservation confirmation page to the terminal of the member.

15. The server system according to claim 14, wherein
the tentative reservation information storage unit is capable of further storing an email address of each member and an approval flag indicating whether the each member has given approval or not in association with the tentative reservation number,
the server system further comprises a member information registration unit configured to write information specifying a member corresponding to each specified email address in association with the tentative reservation number into the tentative reservation information storage unit,
the approval request email creation and sending unit creates an approval request email further containing member identification data corresponding to information specifying a member and sends the approval request email to an email address of a member corresponding to each member identification data,
upon receiving the response data further containing the member identification data from the terminal of the member, the response receiving unit further identifies a member corresponding to the member identification data and sets the approval flag corresponding to the,
tentative reservation number stored in the tentative reservation information storage unit and information specifying the identified member, and
the tentative reservation confirmation page creation unit further reads the information specifying each member corresponding to the tentative reservation number and the approval flag from the tentative reservation information storage unit and creates a tentative reservation confirmation page further containing an item related to a response status of each member using the information specifying each member and the approval flag.

16. The server system according to claim 14, wherein
if the identified member is an organizer, the tentative reservation confirmation page creation unit creates a tentative reservation confirmation page further containing a reservation finalization element for finalizing whether or not to place a reservation for a tentative reservation related to the designated tentative reservation number,
the server system further comprises a reservation finalization request receiving unit configured to receive a reservation finalization request at least containing identification data of the reservation finalization element from the terminal of the organizer, and
upon receiving the reservation finalization request, the first order quantity finalization unit specifies a tentative reservation number corresponding to the reservation finalization request and finalizes an order quantity corresponding to the specified tentative reservation number.

17. A group reservation support method in a group reservation support system where a terminal of each member forming a group of a plurality of members and a server system supporting an accommodation plan reservation procedure carried out by an organizer representing the group via a Web page are connected through a communication network, the method executed by the server system, implemented on a hardware server comprising a processor capable of accessing:
a reservation information storage unit capable of storing, in association with a reservation number, identification information of an organizer, identification information of an accommodation plan, and an order quantity of the accommodation plan, and
a tentative reservation information storage unit capable of storing, in association with a tentative reservation number, identification information of an organizer, identification information of an accommodation plan, a tentative order quantity of the accommodation plan, and number of members decided to participate,
the method comprising:
a tentative reservation application information receiving step of receiving the identification information of an organizer, the identification information of an accommodation plan, and the tentative order quantity of the accommodation plan from a terminal of the organizer;
a tentative reservation information registration step of writing the received information items in association with a tentative reservation number into the tentative reservation information storage unit;
an approval request email creation and sending step of creating an approval request email at least containing a tentative reservation identification data corresponding to the tentative reservation number and sending the approval request email to the terminals that are used by members other than the organizer;
a response receiving step of receiving a response data containing the tentative reservation identification data from the terminal of a member other than the organizer;
a first reservation placement determination step of obtaining a number of members decided to participate corresponding to the tentative reservation number, identified by the tentative reservation identification data, and updated based on the response data and determining that a reservation of an order quantity of one is to be placed each time the updated number of members decided to participate reaches a multiple of a maximum number of guests allowed for a room type of an accommodation plan; and a reservation information partial registration step of, in response to the determining of the first reservation placement determination step, writing identification information of an organizer and identification information of an accommodation plan corresponding to a tentative reservation number related to a tentative reservation determined that a reservation is to be placed and the order quantity of one in association with a new reservation number into the reservation information storage unit, wherein at least one of the tentative reservation application information receiving step, the tentative reservation information registration step, the approval request email creation and sending step, the response receiving step, the first reservation placement determination step, and the reservation information partial registration step is performed by the processor of the server system.

18. A non-transitory computer-readable recording medium storing a group reservation support program in a group reservation support system where a terminal of each member forming a group of a plurality of members and a server system supporting an accommodation plan reservation procedure carried out by an organizer representing the group via a Web page are connected through a communication network, the program causing the server system capable of accessing:

a reservation information storage unit capable of storing, in association with a reservation number, identification information of an organizer, identification information of an accommodation plan, and an order quantity of the accommodation plan, and a tentative reservation information storage unit capable of storing, in association with a tentative reservation number, identification information of an organizer, identification information of an accommodation plan, a. tentative order quantity of the accommodation plan, and number of members decided to participate, to execute a process comprising:

a tentative reservation application information receiving step of receiving the identification information of an organizer, the identification information of an accommodation plan, and the tentative order quantity of the accommodation plan from a terminal of the organizer;

a tentative reservation information registration step of writing the received information items in association with a tentative reservation number into the tentative reservation information storage unit;

an approval request email creation and sending step of creating an approval request email at least containing a tentative reservation identification, data corresponding to the tentative reservation number and sending the approval request email to the terminals that are used by members other than the organizer;

a response receiving step of receiving a response data containing the tentative reservation identification data from the terminal of a member other than the organizer;

a first reservation placement determination step of obtaining a number of members decided to participate corresponding to the tentative reservation number, identified by the tentative reservation identification data, and updated based on the response data and determining that a reservation of an order quantity of one is to be placed each time the updated number of members decided to participate reaches a multiple of a maximum number of guests allowed for a room type of an accommodation plan; and a reservation information partial registration step of, in response to the determination of the first reservation placement determination step, writing identification information of an organizer and identification information of an accommodation plan corresponding to a tentative reservation number related to a tentative reservation determined that a reservation is to be placed and the order quantity of one in association with a new reservation number into the reservation information storage unit.

19. A. group reservation support method in a group reservation support system where a terminal of each member forming a group of a plurality of members and a server system supporting an accommodation plan reservation procedure carried out by an organizer representing the group via a Web page are connected through a communication network, the method executed by the server system, implemented on a hardware server comprising a processor capable of accessing:

a reservation information storage unit capable of storing, in association with a reservation number, identification information of an organizer, identification information of an accommodation plan, and an order quantity of the accommodation plan, and a tentative reservation information storage unit capable of storing, in association with a tentative reservation number, identification information of an organizer, identification information of an accommodation plan, a tentative order quantity of the accommodation plan, and number of members decided to participate, the method comprising:

a tentative reservation application information receiving step of receiving the identification information of an organizer, the identification information of an accommodation plan, and the tentative order quantity of the accommodation plan from a terminal of the organizer;

a tentative reservation information registration step of writing the received information items in association with a tentative reservation number into the tentative reservation information storage unit;

an approval request email creation and sending step of creating an approval request email at least containing a tentative reservation identification data corresponding to the tentative reservation number and sending the approval request email to the terminals that are used by members other than the organizer;

a response receiving step of receiving a response data containing the tentative reservation identification data from the terminal of a member other than the organizer;

a first order quantity finalization step of obtaining a number of members decided to participate corresponding to the tentative reservation number, identified by the tentative reservation identification data, and updated based on the response data, and calculating a minimum integer not less than a value obtained by dividing the number of members decided to participate by a maximum number of guests allowed for a room type of the accommodation plan, and finalizing an order quantity, corresponding to the tentative reservation number, to the calculated minimum integer; and a reservation information registration step of writing identification information of an organizer and identification information of an accommodation plan corresponding to the tentative reservation number of which the order quantity is finalized and the finalized order quantity in association with a reservation number into the reservation information storage unit, wherein at least one of the tentative reservation application information receiving step, the tentative reservation information registration step, the approval request email creation and sending step, the response receiving step, the first order quantity finalization step, and the reservation information registration step is performed by the processor of the server system.

20. A non-transitory computer-readable recording medium storing a group reservation support program in a group reservation support system where a terminal of each member forming a group of a plurality of members and a server system supporting an accommodation plan reservation procedure carried out by an organizer representing the group via a Web page are connected through a communication network, the program causing the server system capable of accessing:

a reservation information storage unit capable of storing, in association with a reservation number, identification information of an organizer, identification information of an accommodation plan, and an order quantity of the accommodation plan, and a tentative reservation information storage unit capable of storing, in association with a tentative reservation number, identification information of an organizer, identification information of an accommodation plan, a tentative order quantity of the accommodation plan, and number of members decided to participate, to execute a process comprising:

a tentative reservation application information receiving step of receiving the identification information of an organizer, the identification information of an accommodation plan, and the tentative order quantity of the accommodation plan from a terminal of the organizer;

a tentative reservation information registration step of writing the received information items in association with a tentative reservation number into the tentative reservation information storage unit;

an approval request email creation and sending step of creating an approval request email at least containing a tentative reservation identification data corresponding to the tentative reservation number and sending the approval request email to the terminals that are used by members other than the organizer;

a response receiving step of receiving a response data containing the tentative reservation identification data from the terminal of a member other than the organizer;

a first order quantity finalization step of obtaining a number of members decided to participate corresponding to the tentative reservation number, identified by the tentative reservation identification data, and updated based on the response data, and calculating a minimum integer not less than a value obtained by dividing the number of members decided to participate by a maximum number of guests allowed for a room type of the accommodation plan, and finalizing an order quantity, corresponding to the tentative reservation number, to the calculated minimum integer; and a reservation information registration step of writing identification information of an organizer and identification information of an accommodation plan corresponding to the tentative reservation number of which the order quantity is finalized and the finalized order quantity in association with a reservation number into the reservation information storage unit.

* * * * *